(12) United States Patent
Yoshida et al.

(10) Patent No.: US 7,901,826 B2
(45) Date of Patent: Mar. 8, 2011

(54) FUEL CELL

(75) Inventors: Hiromichi Yoshida, Shioya-gun (JP); Shigeru Inai, Shioya-gun (JP); Minoru Koshinuma, Utsunomiya (JP); Ryo Jinba, Utsunomiya (JP); Seiji Sugiura, Utsunomiya (JP); Naoki Mitsuta, Nasukarasuyama (JP); Katsumi Hayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1067 days.

(21) Appl. No.: 11/388,431

(22) Filed: Mar. 24, 2006

(65) Prior Publication Data

US 2006/0216572 A1    Sep. 28, 2006

(30) Foreign Application Priority Data

Mar. 25, 2005    (JP) .................. 2005-089588

(51) Int. Cl.
*H01M 2/38* (2006.01)
*H01M 2/40* (2006.01)
*H01M 28/24* (2006.01)

(52) U.S. Cl. .................. 429/457; 429/414; 429/456

(58) Field of Classification Search .............. 429/40
See application file for complete search history.

(56) References Cited

U.S. PATENT DOCUMENTS

| | | | | |
|---|---|---|---|---|
| 3,814,631 A * | 6/1974 | Warszawski et al. | ........... | 429/39 |
| 4,590,135 A * | 5/1986 | Warszawski et al. | ........... | 429/38 |
| 6,071,635 A * | 6/2000 | Carlstrom, Jr. | .................. | 429/34 |
| 6,248,466 B1 * | 6/2001 | Takahashi et al. | .............. | 429/38 |
| 6,833,213 B2 * | 12/2004 | Wada et al. | ..................... | 429/39 |
| 7,138,200 B1 * | 11/2006 | Iwase et al. | ..................... | 429/34 |
| 2002/0192531 A1 * | 12/2002 | Zimmerman et al. | .......... | 429/38 |
| 2003/0077501 A1 * | 4/2003 | Knights et al. | ................... | 429/38 |
| 2003/0104262 A1 * | 6/2003 | Kuroki et al. | .................... | 429/36 |
| 2004/0106028 A1 * | 6/2004 | Sugiura et al. | ................... | 429/26 |
| 2005/0255364 A1 * | 11/2005 | Cho et al. | ......................... | 429/38 |

FOREIGN PATENT DOCUMENTS

| | | |
|---|---|---|
| CA | 2256276 | 4/2003 |
| JP | 2001-332281 | 11/2001 |
| JP | 2003-077495 | 3/2003 |
| JP | 2004-171824 | 6/2004 |

OTHER PUBLICATIONS

Canadian Office Action for Application No. 2,540,773, dated Apr. 3, 2009.
Canadian Office Action for Application No. 2,540,773, dated Feb. 3, 2010.
Japanese Office Action for Application No. 2005-089588, dated Aug. 17, 2010.

* cited by examiner

*Primary Examiner* — Ula C Ruddock
*Assistant Examiner* — Jacob Marks
(74) *Attorney, Agent, or Firm* — Nelson Mullins Riley & Scarborough LLP; Anthony A. Laurentano, Esq.

(57) ABSTRACT

An oxygen-containing gas flow field is formed on a surface of a first metal separator. The oxygen-containing gas flow field is connected between an oxygen-containing gas supply passage and an oxygen-containing gas discharge passage. The oxygen-containing gas flow field comprises oxygen-containing gas flow grooves, and ends of the oxygen-containing gas flow grooves are extended outwardly beyond ends of electrode catalyst layer of a membrane electrode assembly, and connected to an inlet buffer and an outlet buffer. When the purging process is performed at the time of stopping operation of the fuel cell, the purging air supplied to the oxygen-containing gas flow field discharges water retained in the electrode catalyst layers from the ends to the outlet buffer.

8 Claims, 19 Drawing Sheets

FUEL CELL

BACKGROUND OF THE INVENTION

1. Field of the Invention

The present invention relates to a fuel cell formed by stacking an electrolyte electrode assembly and separators horizontally. The electrolyte electrode assembly includes a pair of electrodes and an electrolyte interposed between the electrodes. A reactant gas flow field is formed between the electrolyte electrode assembly and one of separators sandwiching the electrolyte electrode assembly for supplying a reactant gas along a surface of the electrode, and a reactant gas passage connected to an inlet or an outlet of the reactant gas flow field extends through the fuel cell.

2. Description of the Related Art

For example, a solid polymer electrolyte fuel cell employs a solid polymer electrolyte membrane. The solid polymer electrolyte membrane is an ion exchange membrane. In the fuel cell, an anode and a cathode each including an electrode catalyst (electrode catalyst layer) and a porous carbon (gas diffusion layer) are provided on both surfaces of the solid polymer electrolyte membrane to form a membrane electrode assembly (MEA). The membrane electrode assembly is sandwiched between separators (bipolar plates) to form a unit of power generation cell. Generally, in use, the fuel cell has stack structure formed by stacking a predetermined number of power generation cells.

In the fuel cell, a fuel gas (reactant gas) such as a gas chiefly containing hydrogen (hereinafter also referred to as the "hydrogen-containing gas") is supplied to the anode, and a gas (reactant gas) chiefly containing oxygen or the air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating DC electrical energy.

In the fuel cell, generally, internal manifolds are provided for supplying the reactant gases, i.e., the fuel gas and the oxygen-containing gas to the anodes and the cathodes of the power generation cells in the form of stack structure. The internal manifold includes a reactant gas supply passage and a reactant gas discharge passage extending through the power generation cells in the stacking direction. The reactant gas supply passage and the reactant gas discharge passage are connected to an inlet and an outlet of a reactant gas flow field for supplying the reactant gas along the electrode surface.

In the structure, water produced in the power generation reaction tends to flow into the oxygen-containing gas passages (reactant gas passages) including the oxygen-containing gas supply passage and the oxygen-containing gas discharge passages for the oxygen-containing gas, and the water may be retained in the oxygen-containing gas passages. Further, water produced by water condensation or the like may be retained in the fuel gas passages (reactant gas passages) including the fuel gas supply passage and the fuel gas discharge passages for the fuel gas. Thus, the oxygen-containing gas passages or the fuel gas passages may be narrowed or clogged due to the retained water. Under the circumstances, the flows of the oxygen-containing gas and the fuel gas tend to be disturbed undesirably, and the power generation performance is degraded.

In this regard, for example, a method of operating a power generation apparatus using a solid polymer electrolyte fuel cell as disclosed in Japanese Laid-Open Patent Publication No. 2001-332281 is known. In the conventional technique, the power generation apparatus using the solid polymer electrolyte fuel cell includes a fuel cell body and a humidifying apparatus. The fuel cell body includes an anode, a cathode, and a solid polymer electrolyte membrane interposed between the anode and the cathode. Each of the anode and the cathode includes a catalyst layer and a porous gas diffusion layer. Power generation is performed in the fuel cell body by supplying the fuel gas containing hydrogen to the anode, and supplying the air as the oxygen-containing gas to the cathode. The humidifying apparatus is used for humidifying the air. For stopping operation of the power generation apparatus, firstly, humidification of the air is stopped, and then, the non-humidified air is supplied to the cathode for a predetermined period of time. Thereafter, operation of the fuel cell power generation apparatus is stopped.

Generally, the reactant gas flow field has a complicated flow field pattern such as a serpentine pattern such that gas grooves in the flow field become sufficiently long. At portions connecting the reactant gas flow field and the reactant gas passages, buffers are provided for smoothly supplying, or discharging the reactant gas.

In the structure, the reactant gas flow field is divided in the power generation surface. In the case of adopting the conventional operating method, the flow rate of the gas tends to be decreased in the buffers. Consequently, water may be retained in the reactant gas flow field in the areas just before the buffers. As a result, in particular, when the temperature is low, the retained water may be frozen, damaging the electrode catalysts of the electrolyte electrode assembly.

SUMMARY OF THE INVENTION

A main object of the present invention is to provide a fuel cell having simple structure which makes it possible to smoothly and reliably discharge the retained water from electrode catalyst layers of an electrolyte electrode assembly and achieve the desired power generation performance.

According to an aspect of the present invention, a fuel cell is formed by stacking an electrolyte electrode assembly and separators horizontally. The electrolyte electrode assembly includes a pair of electrodes and an electrolyte interposed between the electrodes. A reactant gas flow field is formed between the electrolyte electrode assembly and one of separators sandwiching the electrolyte electrode assembly for supplying a reactant gas along a surface of the electrode, and a reactant gas passage connected to an inlet or an outlet of the reactant gas flow field extends through the fuel cell in a stacking direction.

The separator has a buffer between the reactant gas flow field and the reactant gas passage, and an end of the reactant gas flow field near the reactant gas passage is oriented in a substantially horizontal direction, extended outwardly beyond an end of an electrode catalyst layer of the electrolyte electrode assembly, and connected to the buffer.

Preferably, the electrode includes the electrode catalyst layer and a gas diffusion layer, and the gas diffusion layer is extended outwardly beyond the end of the electrode catalyst layer, and covers the buffer. Further, preferably, the distance between the end of the reactant gas flow field and bosses of the buffer is equal to the width of grooves in the reactant gas flow field.

Further, preferably, ends of a plurality of grooves of the reactant gas flow field are merged between the electrode catalyst layer and the buffer. Further, preferably, at the end of the reactant gas flow field, grooves of the reactant gas flow field are tapered to decrease the size of the openings of the grooves in cross section toward the reactant gas passage. Further, preferably, the lowermost position of the buffer is under the lowermost position of the end of the reactant gas flow field.

Further, the separator may have a hydrophilic portion between the end of the reactant gas flow field and the reactant gas passage. As the hydrophilic treatment, various conventional methods can be adopted. For example, it is possible to use a gold plating surface treatment.

Further, in the fuel cell according to another aspect of the present invention, ends of the reactant gas flow field near the reactant gas passage are oriented in a substantially horizontal direction, extended outwardly beyond an end of an electrode catalyst layer of the electrolyte electrode assembly, and the ends are merged with each other in a direction toward the reactant gas passage.

Further, in the fuel cell according to a further aspect of the present invention, preferably, ends of the reactant gas flow field near the reactant gas passage are oriented in a substantially horizontal direction, extended outwardly beyond an end of an electrode catalyst layer of the electrolyte electrode assembly, and grooves at the ends are tapered to decrease the size of the openings of the grooves in cross section toward the reactant gas passage.

Further, in the fuel cell according to a still further aspect of the present invention, an end of the reactant gas flow field near the reactant gas passage is extended outwardly beyond an end of an electrode catalyst layer of the electrolyte electrode assembly, and a reinforcement impregnation portion such as a resin impregnation portion is provided at an end of the electrolyte electrode assembly extended from the end of the electrode catalyst layer to the reactant gas passage.

Preferably, ends of the electrolyte electrode assembly protrude outwardly from four corners of the electrolyte electrode assembly, and at each of the ends of the electrolyte electrode assembly, the reinforcement impregnation portion is provided in a gas diffusion layer of one of the electrodes.

Further, preferably, in the electrolyte electrode assembly, the size of the gas diffusion layer of one of the electrodes is larger than the size of the gas diffusion layer of the other of the electrodes, and the reinforcement impregnation portion is provided in the gas diffusion layer having the larger size.

According to the present invention, the end of the reactant gas flow field is extended beyond the end of the electrode catalyst layer of the electrolyte electrode assembly toward the buffer. Therefore, when operation of the fuel cell is stopped, it is possible to prevent the water from being retained in the electrode catalyst layer. Accordingly, in particular, even if the temperature is low, the electrode catalyst layer is not frozen by the retained water. Thus, improvement in durability of the electrolyte electrode assembly is achieved advantageously.

Further, the ends of the reactant gas flow field are extended beyond the end of the electrode catalyst layer of the electrolyte electrode assembly toward the reactant gas passage, and the ends are merged with each other or tapered to decrease the size of the opening in cross section, toward the reactant gas passage. In the structure, the flow rate of the gas is not decreased in the reactant gas flow field, and the retained water can be discharged easily and reliably to the outside.

Further, in the electrolyte electrode assembly, the reinforcement impregnation portion is formed between the reactant gas flow field and the reactant gas passage. Thus, the electrolyte electrode assembly is not damaged when the retained water is frozen. Accordingly, operation of the fuel cell can be started suitably, and improvement in durability of the fuel cell is achieved. Further, since no gap is present in the reinforcement impregnation portion, it is possible to effectively prevent the electrolyte electrode assembly from being damaged due to the entry of water.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
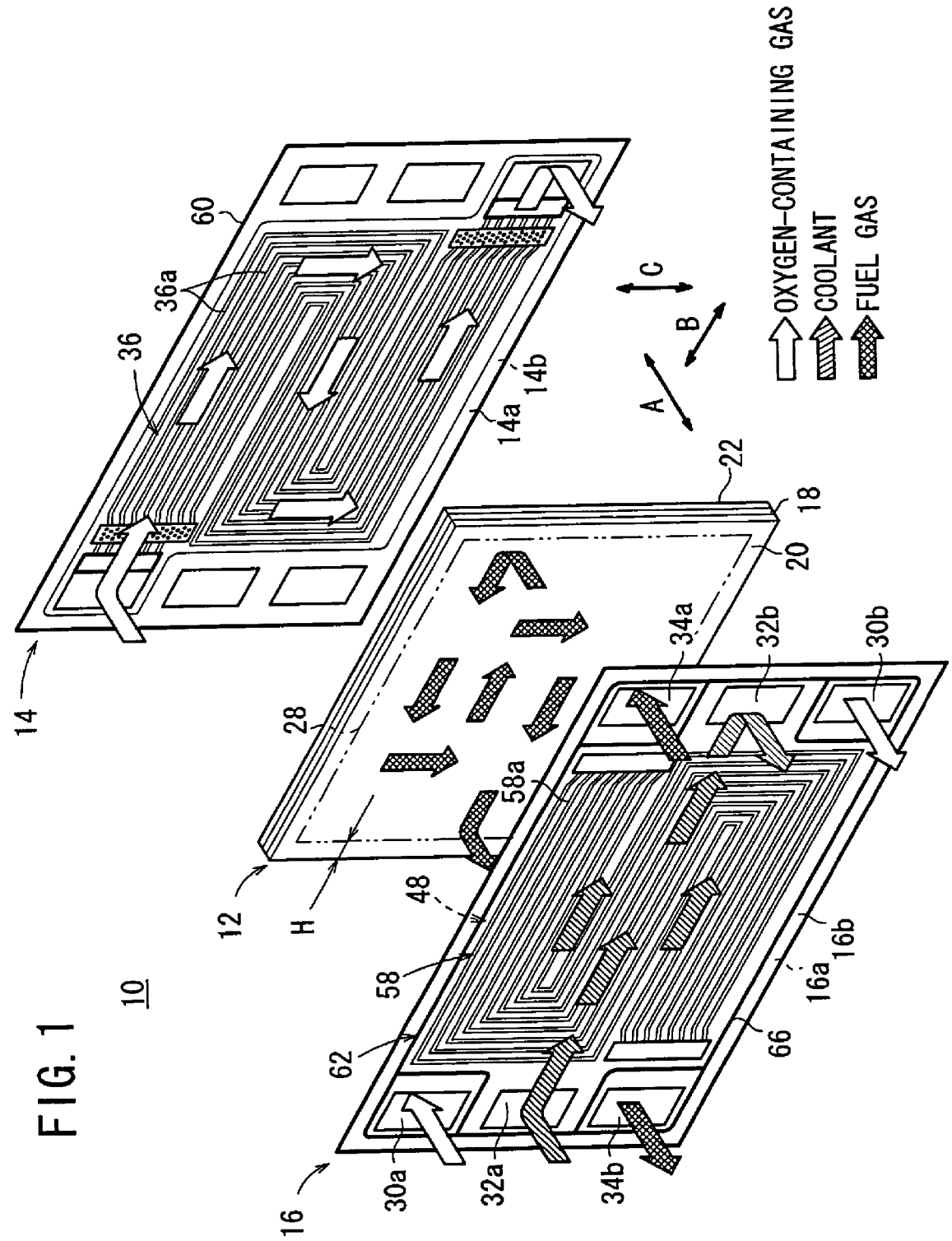
FIG. 1 is an exploded perspective view showing main components of a fuel cell according to a first embodiment of the present invention.

FIG. 1 is an exploded perspective view showing main components of a fuel cell 10 according to a first embodiment of the present invention. A membrane electrode assembly (electrolyte electrode assembly) 12 and first and second metal separators 14, 16 are stacked together in a horizontal direction indicated by an arrow A. In general, a plurality of fuel cells 10 are stacked together to form a fuel cell stack.

The membrane electrode assembly 12 includes an anode 20, a cathode 22, and a solid polymer electrolyte membrane 18 interposed between the anode 20 and the cathode 22. The solid polymer electrolyte membrane 18 is formed by impregnating a thin membrane of perfluorosulfonic acid with water, for example.

Figure 2:
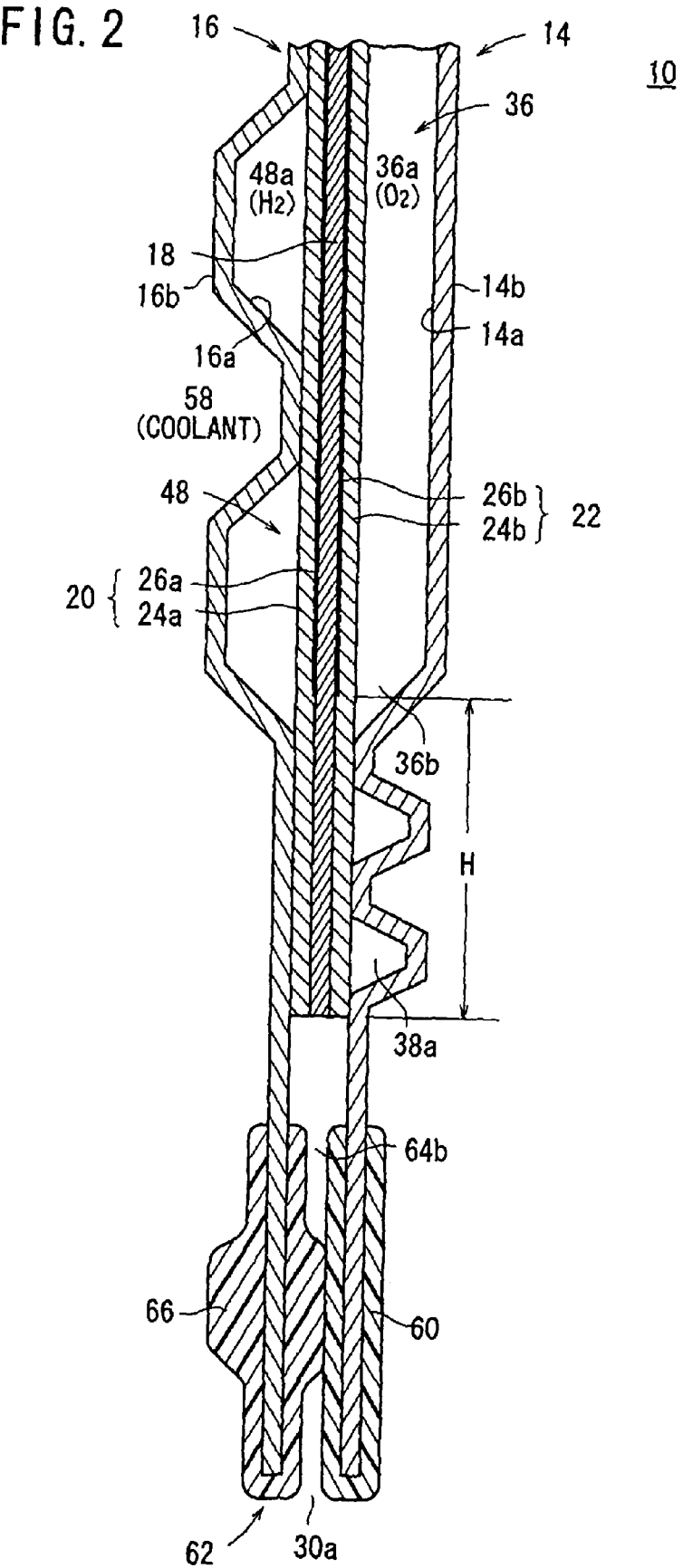
FIG. 2 is a cross sectional view showing the fuel cell taken along a position near an inlet buffer for an oxygen-containing gas.

As shown in FIG. 2, each of the anode 20 and the cathode 22 has a gas diffusion layer 24a, 24b such as a carbon paper, and an electrode catalyst layer 26a, 26b of platinum alloy supported on porous carbon particles. The carbon particles are deposited uniformly on the surface of the gas diffusion layer 24a, 24b. On both surfaces of the solid polymer electrolyte membrane 18, ends of the electrode catalyst layers 26a, 26b are spaced inwardly from the end of the solid polymer electrolyte membrane 18 by the distance H. The membrane electrode assembly 12 has a power generation surface 28 in the area-spaced inwardly from its outer end by the distance H (see FIG. 1).

At one end of the fuel cell 10 in a direction indicated by an arrow B, an oxygen-containing gas supply passage (reactant gas passage) 30a for supplying an oxygen-containing gas, a coolant supply passage 32a for supplying a coolant, and a fuel gas discharge passage (reactant gas passage) 34b for discharging a fuel gas such as a hydrogen-containing gas are arranged in a direction indicated by an arrow C. The oxygen-containing gas supply passage 30a, the coolant supply passage 32a, and the fuel gas discharge passage 34b extend through the fuel cell 10 in the direction indicated by the arrow A.

At the other end of the fuel cell 10 in the direction indicated by the arrow B, a fuel gas supply passage (reactant gas passage) 34a for supplying the fuel gas, a coolant discharge passage 32b for discharging the coolant, and the oxygen-containing gas discharge passage (reactant gas passage) 30b for discharging the oxygen-containing gas are arranged in the direction indicated by the arrow C. The fuel gas supply passage 34a, the coolant discharge passage 32b, and the oxygen-containing gas discharge passage 30b extend through the fuel cell 10 in the direction indicated by the arrow A.

Figure 3:
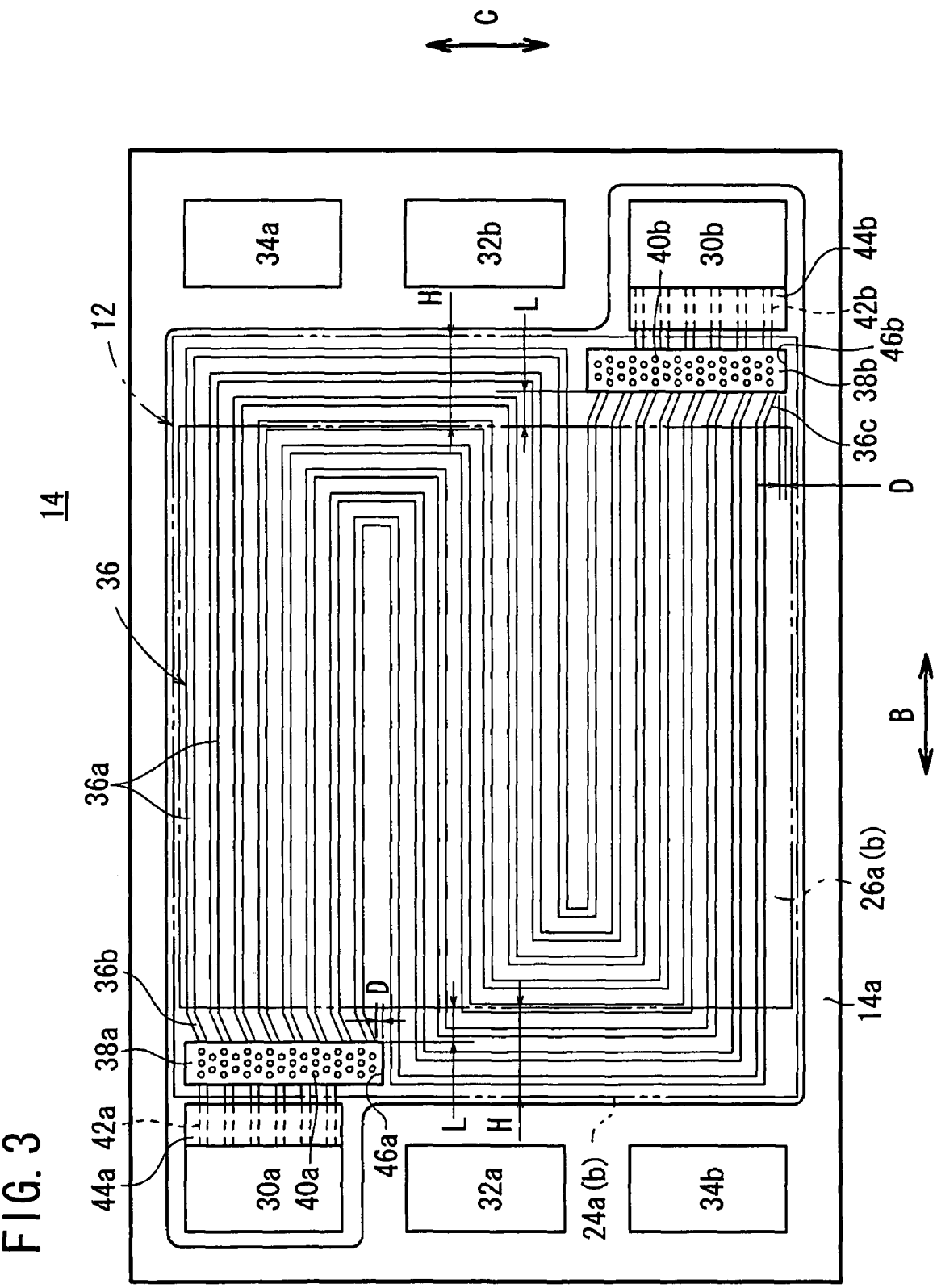
FIG. 3 is a front view showing a first metal separator of the fuel cell.

As shown in FIGS. 1 and 2, the first metal separator 14 has an oxygen-containing gas flow field (reactant gas flow field) 36 on its surface 14a facing the membrane electrode assembly 12. As shown in FIG. 3, the oxygen-containing gas flow field 36 comprises a plurality of oxygen-containing gas flow grooves 36a having a serpentine pattern in the direction indicated by the arrow B, and extending toward the direction indicated by the arrow C. Specifically, the oxygen-containing gas flow grooves 36a have two turn regions and three straight regions for allowing the oxygen-containing gas to flow back and forth in the direction indicated by the arrow B.

An inlet buffer 38a is provided between the oxygen-containing gas supply passage 30a and the oxygen-containing gas flow field 36, and an outlet buffer 38b is provided between the oxygen-containing gas discharge passage 30b and the oxygen-containing gas flow field 36. Ends 36b of the oxygen-containing gas flow grooves 36a near the oxygen-containing gas supply passage 30a are oriented in a substantially horizontal direction, more preferably, oriented in a direction inclined downwardly from the horizontal direction, extended outwardly beyond the ends of the electrode catalyst layers 26a, 26b of the membrane electrode assembly 12 by the distance L, and connected to the inlet buffer 38a. The distance L is determined such that the water does not return to the electrode catalyst layers 26a, 26b, in the range of 1 to 10 mm, more preferably, in the range of 2 to 10 mm. If the distance L is less than 1 mm, the water is not discharged efficiently. If the distance L is greater than 10 mm, the area which is not used for power generation is increased, and the size of the fuel cell 10 becomes large.

Ends 36c of the oxygen-containing gas flow grooves 36a near the oxygen-containing gas discharge passage 30b are oriented in a substantially horizontal direction, more preferably, oriented in a direction inclined downwardly from the horizontal direction, extended outwardly beyond the ends of the electrode catalyst layers 26a, 26b of the membrane electrode assembly 12 by the distance L, and connected to the outlet buffer 38b. A plurality of bosses (or dimples) 40a, 40b are formed in the inlet buffer 38a and the outlet buffer 38b.

The oxygen-containing gas supply passage 30a and the oxygen-containing gas discharge passage 30b are connected to the inlet buffer 38a and the outlet buffer 38b through a plurality of connection grooves 42a, 42b. Plate members 44a, 44b as bridges are provided along seal lines of the connection grooves 42a, 42b. The bottom surface 46a of the inlet buffer 38a and the bottom surface 46b of the outlet buffer 38b are spaced away downwardly from the ends 36b, 36c at the lowermost positions of the oxygen-containing gas flow grooves 36a by the distance D.

Figure 4:
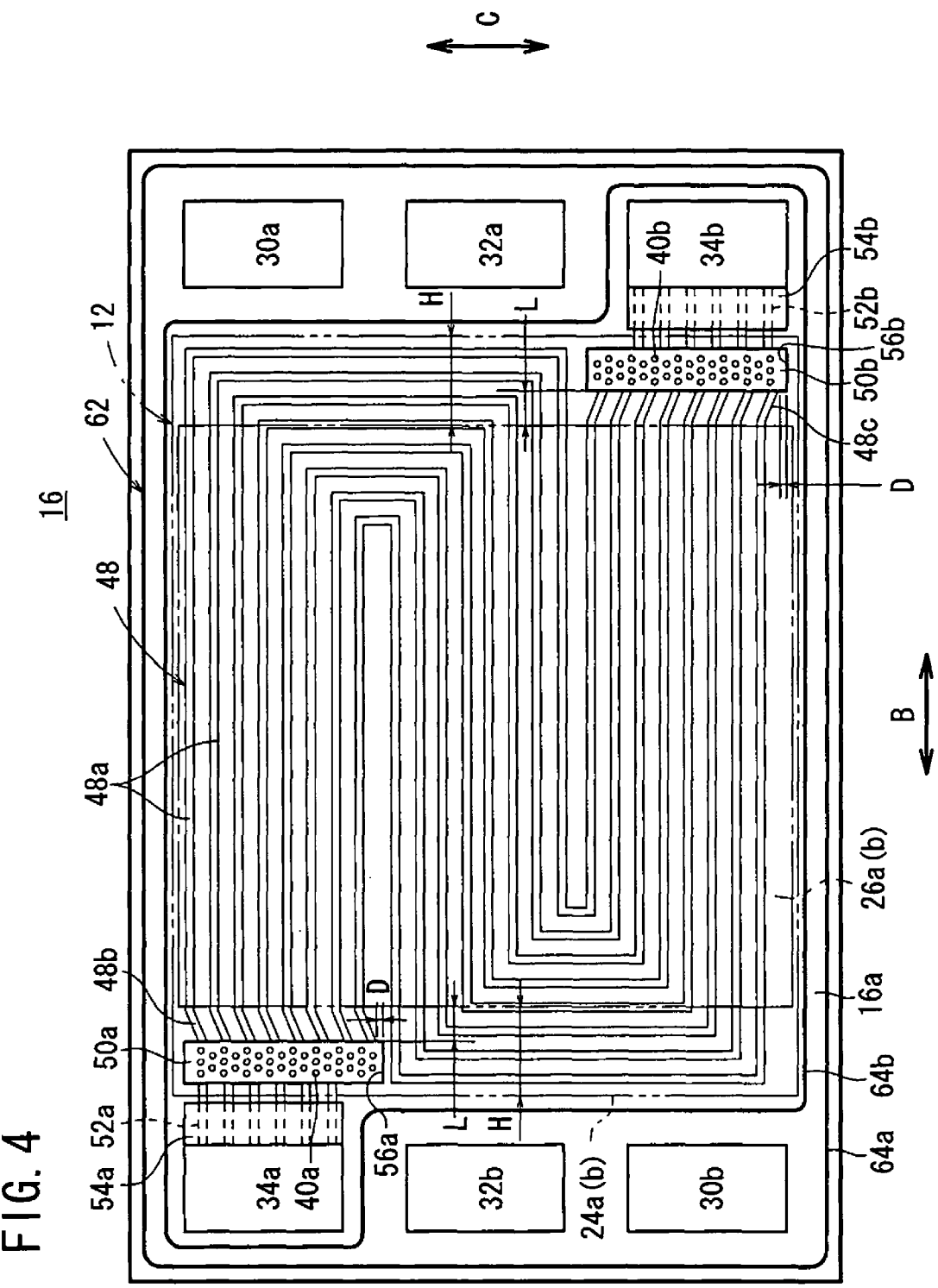
FIG. 4 is a front view showing a second metal separator of the fuel cell.

As shown in FIG. 4, the second metal separator 16 has a fuel gas flow field (reactant gas flow field) 48 on its surface 16a facing the membrane electrode assembly 12. As with the oxygen-containing gas flow field 36, the fuel gas flow field 48 comprises a plurality of fuel gas flow grooves 48a having a serpentine pattern including two turn regions and three straight regions for allowing the fuel gas to flow back and forth in the direction indicated by the arrow B.

An inlet buffer 50a is provided between the fuel gas supply passage 34a and the fuel gas flow field 48, and an outlet buffer 50b is provided between the fuel gas discharge passage 34b and the oxygen-containing gas flow field 48. Ends 48b, 48c of the fuel gas flow grooves 48a are inclined slightly downwardly from the horizontal direction, and extended outwardly beyond the ends of the electrode catalyst layers 26a, 26b of the membrane electrode assembly 12 by the distance L, and connected to the inlet buffer 50a and the outlet buffer 50b, respectively.

The fuel gas supply passage 34a and the fuel gas discharge passage 34b are connected to the inlet buffer 50a and the outlet buffer 50b through a plurality of connection grooves 52a, 52b. Plate members 54a, 54b as bridges are provided along seal lines of the connection grooves 52a, 52b. The bottom surface 56a of the inlet buffer 50a is spaced away downwardly from the end 48b at the lowermost position of the fuel gas flow grooves 48a by the distance D, and the bottom surface 56b of the outlet buffer 50b is spaced away downwardly from the end 48c at the lowermost position of the fuel gas flow grooves 48a by the distance D.

When a plurality of fuel cells 10 are stacked together, a surface 14b of the first metal separator 14 faces a surface 16b of the second metal separator 16, and a coolant flow field 58 is formed between the surfaces 14b, 16b of the first and second metal separators 14, 16 (see FIG. 1). That is, the coolant flow field 58 is formed on the backside of the oxygen-containing gas flow field 36, and on the backside of the fuel gas flow field 48. The coolant flow field 58 comprises a plurality of coolant flow grooves 58a extending in the directions indicated by the arrows B and C. The coolant flow field 58 is connected to the coolant supply passage 32a and the coolant discharge passage 32b.

As shown in FIGS. 1 to 3, a first seal member 60 is formed integrally, e.g., by injection molding on the surfaces 14a, 14b of the first metal separator 14 around the outer end of the first metal separator 14. The first seal member 60 is a planar seal. On the surface 14a, the first seal member 60 is formed around the oxygen-containing gas supply passage 30a, the oxygen-containing gas discharge passage 30b, and the oxygen-containing gas flow field 36 for preventing leakage of the oxygen-containing gas.

A second seal member 62 is formed integrally, e.g., by injection molding on the surfaces 16a, 16b of the second metal separator 16 around the outer end of the second metal separator 16. The second seal member 62 is a planar seal. As shown in FIG. 4, on the surface 16a, first and second line seals 64a, 64b are provided around the fuel gas supply passage 34a, the fuel gas discharge passage 34b, and the fuel gas flow field 48 for preventing leakage of the fuel gas. On the surface 16b, as shown in FIG. 1, a line seal 66 is provided around the coolant supply passage 32a, the coolant discharge passage 32b, and the coolant flow field 58 for preventing leakage of the coolant.

Next, operation of the fuel cell 10 will be described.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water or ethylene glycol is supplied to the coolant supply passages 32a.

The oxygen-containing gas flows from the oxygen-containing gas supply passage 30a into the oxygen-containing gas flow field 36 of the first metal separator 14. In the oxygen-containing gas flow field 36, as shown in FIG. 3, the oxygen-containing gas temporarily flows through the inlet buffer 38a, and is distributed into the oxygen-containing gas flow grooves 36a. Thus, the oxygen-containing gas flows through the oxygen-containing gas flow grooves 36a in a serpentine pattern along the cathode 22 of the membrane electrode assembly 12 for inducing an electrochemical reaction at the cathode 22.

The fuel gas flows from the fuel gas supply passage 34a into the fuel gas flow field 48 of the second metal separator 16. In the fuel gas flow field 48, as shown in FIG. 4, the fuel gas temporarily flows through the inlet buffer 50a, and is distributed into the fuel gas flow grooves 48a in a serpentine pattern along the anode 20 of the membrane electrode assembly 12 for inducing an electrochemical reaction at the anode 20.

Thus, in the membrane electrode assembly 12, the oxygen-containing gas supplied to the cathode 22, and the fuel gas supplied to the anode 20 are consumed in the electrochemical reactions at electrode catalyst layers 26a, 26b for generating electricity.

Then, the oxygen-containing gas consumed at the cathode 22 is discharged into the oxygen-containing gas discharge passage 30b from the outlet buffer 38b (see FIGS. 1 and 3). Likewise, the fuel gas consumed at the anode 20 is discharged into the fuel gas discharge passage 34b from the outlet buffer 50b (see FIG. 4).

The coolant supplied to the coolant supply passage 32a flows into the coolant flow field 58 formed between the first and second metal separators 14, 16 (see FIG. 1). In the coolant flow field 58, the coolant moves horizontally in the direction indicated by the arrow B, and vertically in the direction indicated by the arrow C. Thus, after the coolant cools the entire power generation surface 28 of the membrane electrode assembly 12, the coolant is discharged into the coolant discharge-passage 32b.

In the first embodiment, as shown in FIG. 3, at the outlet of the oxygen-containing gas flow field 36, the outlet buffer 38b is provided between the oxygen-containing gas discharge passage 30b and the oxygen-containing gas flow field 36. The ends 36c of the oxygen-containing gas flow grooves 36a are extended outwardly beyond the ends of the electrode catalyst layers 26a, 26b of the membrane electrode assembly 12 by the distance L, and connected to the outlet buffer 38b.

In the structure, when operation of the fuel cell 10 is stopped, at the time of purging process for the oxygen-containing gas flow field 36, the flow rate of the purging air flowing along the oxygen-containing gas flow grooves 36a is not decreased at the ends of the electrode catalyst layers 26a, 26b. Accordingly, the water retained in the oxygen-containing gas flow grooves 36a is reliably discharged to the outside of the electrode catalyst layers 26a, 26b, i.e., outside the power generation surface 28 around the outlet buffer 38b and an area near front portion of the ends 36c.

In particular, the ends 36c are extended outwardly beyond the ends of the electrode catalyst layers 26a, 26b by the distance L. The distance L is in the range of 1 to 10 mm, more preferably, in the range of 2 to 10 mm. In the structure, problems due to absorption of water by the electrode catalyst layers 26a, 26b can be avoided, and the retained water is discharged reliably and smoothly from the electrode catalyst layers 26a, 26b.

In the first embodiment, for example, even if the temperature is low, the electrode catalyst layers 26a, 26b are not frozen due to the retained water. Thus, the electrode catalyst layers 26a, 26b are not damaged, and improvement in durability of the membrane electrode assembly 12 is achieved.

Further, the bottom surface 46b of the outlet buffer 38b is spaced downwardly from the end 36c at the lowermost position by the distance D. Therefore, the retained water discharged into the outlet buffer 38b does not flow backwardly from the end 36c to the oxygen-containing gas flow grooves 36a. In the first embodiment, the oxygen-containing gas flow grooves 36a of the oxygen-containing gas flow field 36 and the fuel gas flow grooves 48a of the fuel gas flow field 48 are serpentine flow grooves. However, the present invention is not limited in this respect. For example, the oxygen-containing gas flow grooves 36a and the fuel gas flow grooves 48a may be straight flow grooves. Also in the other embodiments as described later, the oxygen-containing gas flow grooves and the fuel gas flow grooves may be straight flow grooves.

Figure 5:
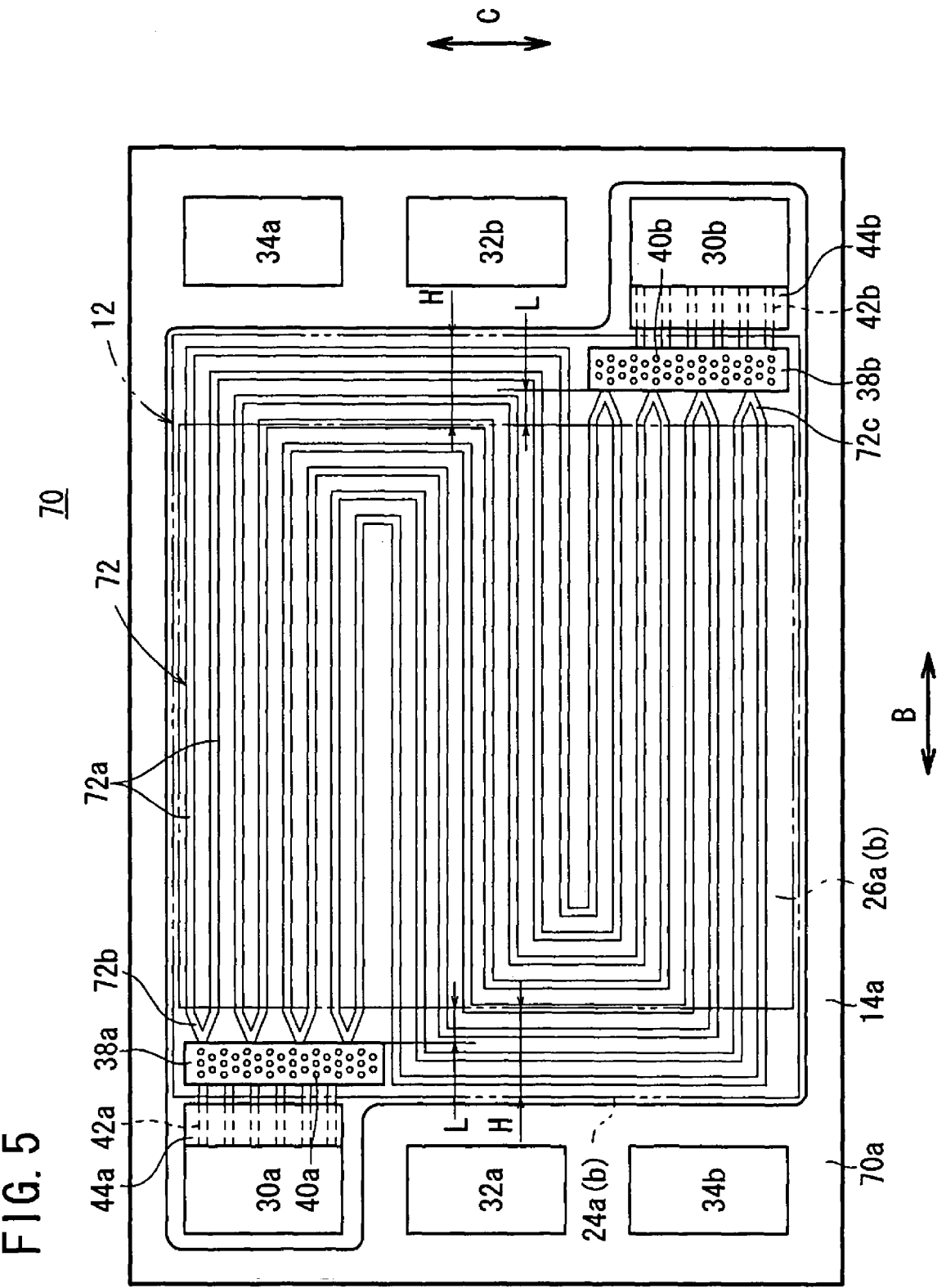
FIG. 5 is a front view showing a first metal separator of a fuel cell according to a second embodiment of the present invention.

FIG. 5 is a front view showing a first metal separator 70 of a fuel cell according to a second embodiment of the present invention. The constituent elements of the first metal separator 70 that are identical to those of the first metal separator 14 according to the first embodiment are labeled with the same reference numeral, and description thereof will be omitted. Also in third to fifteenth embodiments as described later, the constituent elements that are identical to those in the first embodiment are labeled with the same reference numeral, and description thereof will be omitted.

The first metal separator 70 has an oxygen-containing gas flow field (reactant gas flow field) 72 on its surface 70a facing the membrane electrode assembly 12 of the first metal separator 70. The oxygen-containing gas flow field 72 comprises a plurality of oxygen-containing gas flow grooves 72a having a serpentine pattern. Ends 72b, 72c of the oxygen-containing gas flow grooves 72a near the oxygen-containing gas supply passage 30a and the oxygen-containing gas discharge passage 30*b* are extended outwardly beyond the ends of the electrode catalyst layers 26*a*, 26*b* by the distance L. Every two of the oxygen-containing gas flow grooves 72*a* are merged into one groove, and connected to the inlet buffer 38*a* and the outlet buffer 38*b*, respectively.

Specifically, at the ends 72*b*, 72*c*, every two grooves are curved toward each other, and merged into one groove, and then connected to the inlet buffer 38*a* or the outlet buffer 38*b*. The curved portions are not necessarily positioned at the ends of the electrode catalyst layers 26*a*, 26*b*. The curved portions may be provided outside, or inside the ends of the electrode catalyst layers 26*a*, 26*b*.

In the second embodiment, when the purging process is performed at the time of stopping operation of the fuel cell 10, the flow rate of the purging air supplied to the ends 72*c* of the oxygen-containing gas flow grooves 72*a* is maintained, and the purging air is supplied to the outlet buffer 38*b*. Therefore, the water retained in the oxygen-containing gas flow field 72 is smoothly and reliably discharged to the outside of the electrode catalyst layers 26*a*, 26*b* by the purging air. The water is not retained in the electrode catalyst layers 26*a*, 26*b*. Therefore, the same advantages as in the case of the first embodiment can be obtained.

Figure 6:
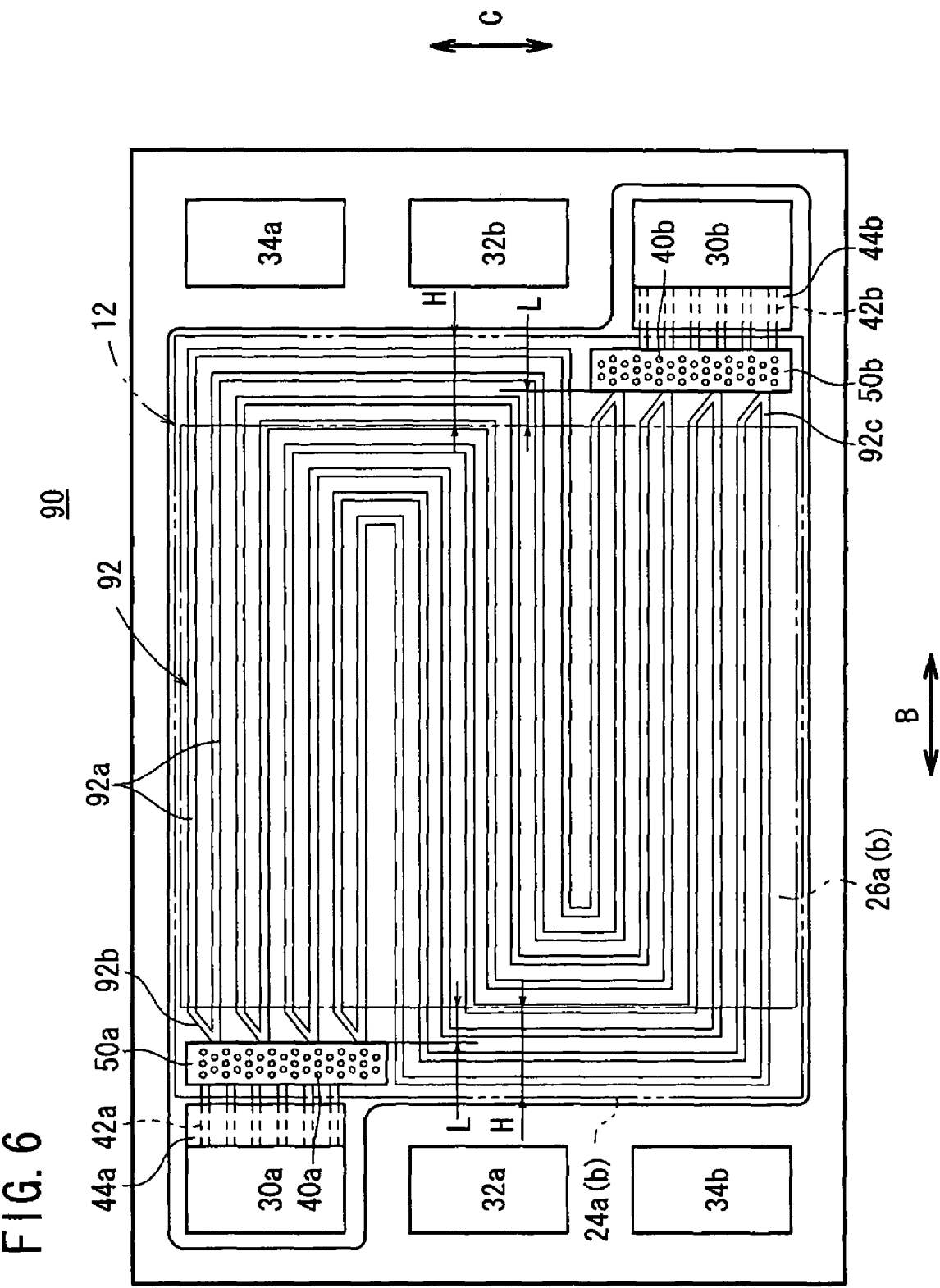
FIG. 6 is a front view showing a first metal separator of a fuel cell according to a third embodiment of the present invention.

FIG. 6 is a front view showing a first metal separator 90 of a fuel cell according to a third embodiment of the present invention.

The first metal separator 90 has an oxygen-containing gas flow field (reactant gas flow field) 92 comprising a plurality of oxygen-containing gas flow grooves 92*a* in a serpentine pattern. At ends 92*b*, 92*c* of the oxygen-containing gas flow grooves 92*a*, every two grooves are merged such that one of the two grooves is curved, and the merged grooves are connected to the inlet buffer 50*a* and the outlet buffer 50*b*. Because the ends 92*b*, 92*c* are extended outwardly from the electrode catalyst layers 26*a*, 26*b* by the distance L, the flow rate of the purging air is not decreased. In the structure, the same advantages as in the case of the first and second embodiments can be obtained. For example, the retained water can be discharged from the electrode catalyst layers 26*a*, 26*b* smoothly and reliably.

Figure 7:
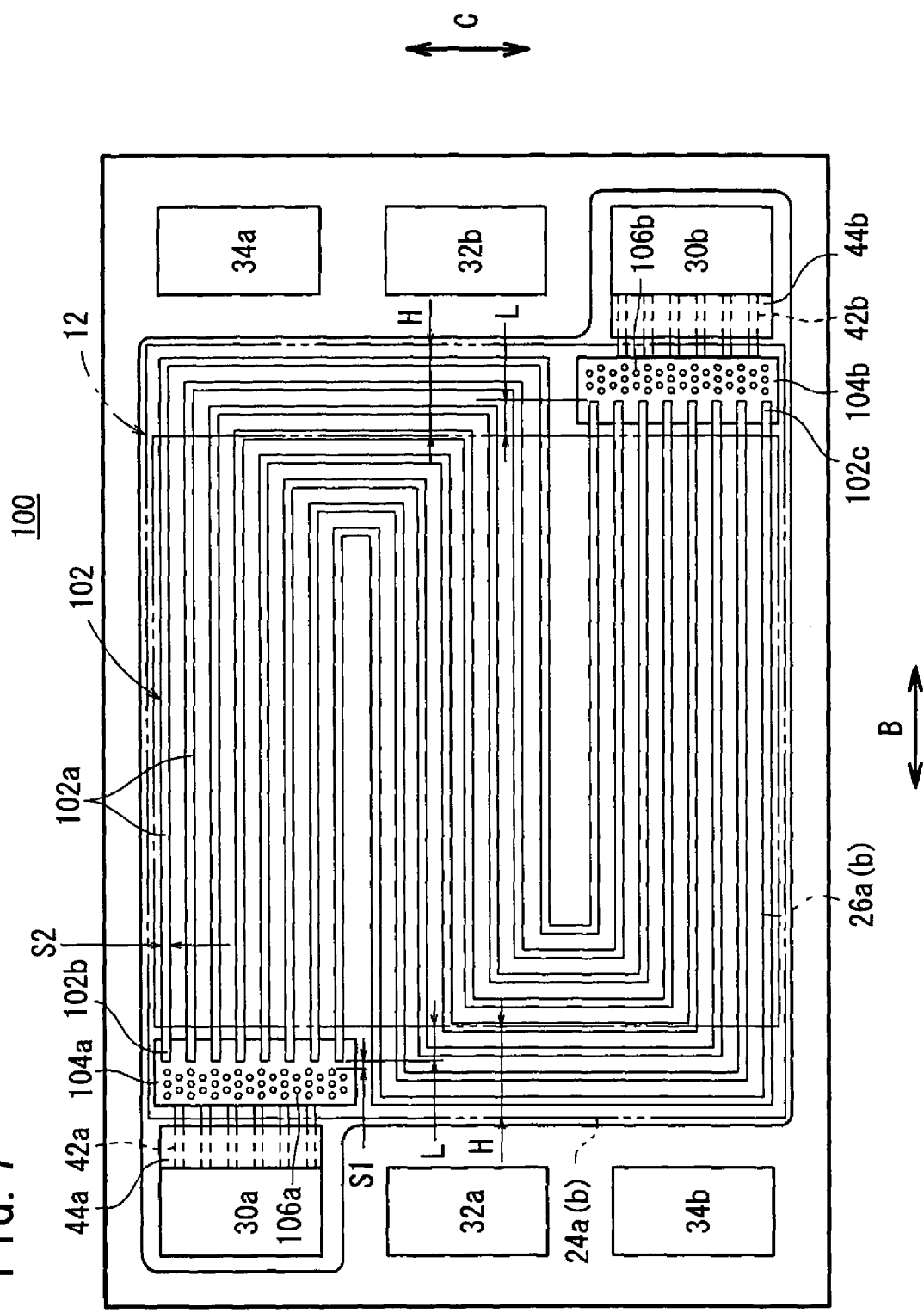
FIG. 7 is a front view showing a first metal separator of a fuel cell according to a fourth embodiment of the present invention.

FIG. 7 is a front view showing a first metal separator 100 according to a fourth embodiment of the present invention. The first metal separator 100 has an oxygen-containing gas flow field (reactant gas flow field) 102 comprising a plurality of oxygen-containing gas flow grooves 102*a* in a serpentine pattern. Ends 102*b*, 102*c* of the oxygen-containing gas flow grooves 102*a* are extended outwardly from the electrode catalyst layers 26*a*, 26*b* by the distance L toward an inlet buffer 104*a* and an outlet buffer 104*b*.

A plurality of bosses 106*a*, 106*b* are formed in the inlet buffer 104*a* and the outlet buffer 104*b*. The distance S1 between the ends 102*b*, 102*c* of the oxygen-containing gas flow grooves 102*a* and the nearest bosses 106*a*, 106*c* is substantially the same as the distance S2 of the groove width of the oxygen-containing gas flow grooves 102*a*.

In the fourth embodiment, when the purging air is supplied to the oxygen-containing gas flow grooves 102*a* of the oxygen-containing gas flow field 102 at the time of stopping operation of the fuel cell, the purging air flows from the ends 102*c* to the outlet buffer 104*b*. The distance S1 between the ends 102*c* and the bosses 106*b* is the same as the groove width S2 of the oxygen-containing gas flow grooves 102*a*. In the structure, it is possible to prevent the gas flow rate in the oxygen-containing gas flow grooves 102*a* from being decreased. Thus, the retained water is reliably discharged form the ends 102*c* of the oxygen-containing gas flow grooves 102*a* to the outlet buffer 104*b*. The same advantages as in the case of the first to third embodiments can be obtained.

Figure 8:
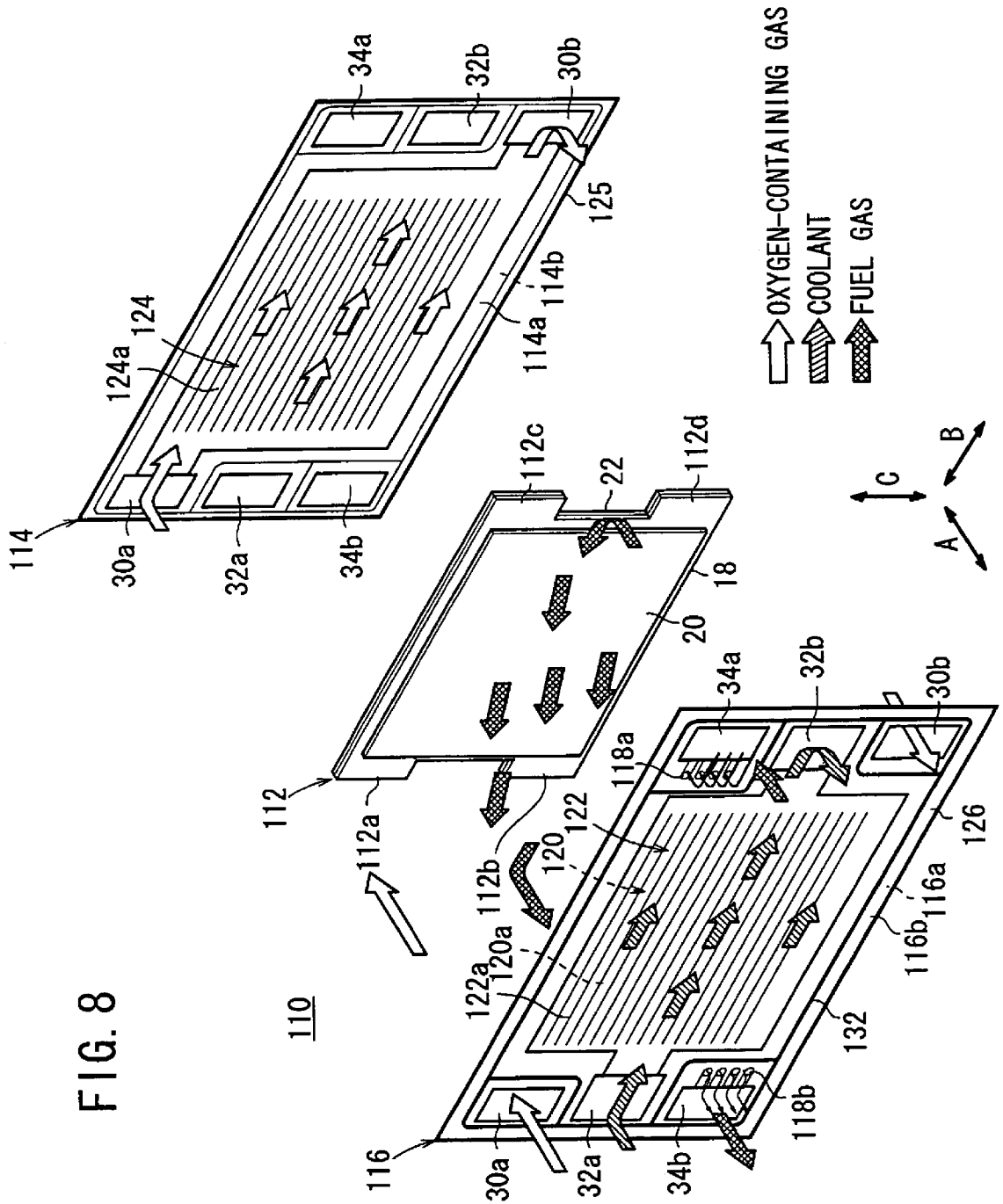
FIG. 8 is an exploded perspective view showing main components of a fuel cell according to a fifth embodiment of the present invention.

FIG. 8 is an exploded perspective view showing main components of a fuel cell 110 according to a fifth embodiment of the present invention. The fuel cell 110 is formed by stacking a membrane electrode assembly (electrolyte electrode assembly) 112 and first and second metal separators 114, 116 in a horizontal direction. The membrane electrode assembly 112 has ends 112*a* to 112*d* extended toward the oxygen-containing gas supply passage 30*a*, the fuel gas discharge passage 34*b*, the fuel gas supply passage 34*a*, and the oxygen-containing gas discharge passage 30*b*. The surface area of the cathode 22 is substantially the same as the surface area of the solid polymer electrolyte membrane 18. The surface area of the anode 20 is smaller than the surface area of the solid polymer electrolyte membrane 18.

The second metal separator 116 has a plurality of supply holes 118*a* near the fuel gas supply passage 34*a*, and a plurality of discharge holes 118*b* near the fuel gas discharge passage 34*b*.

Figure 9:
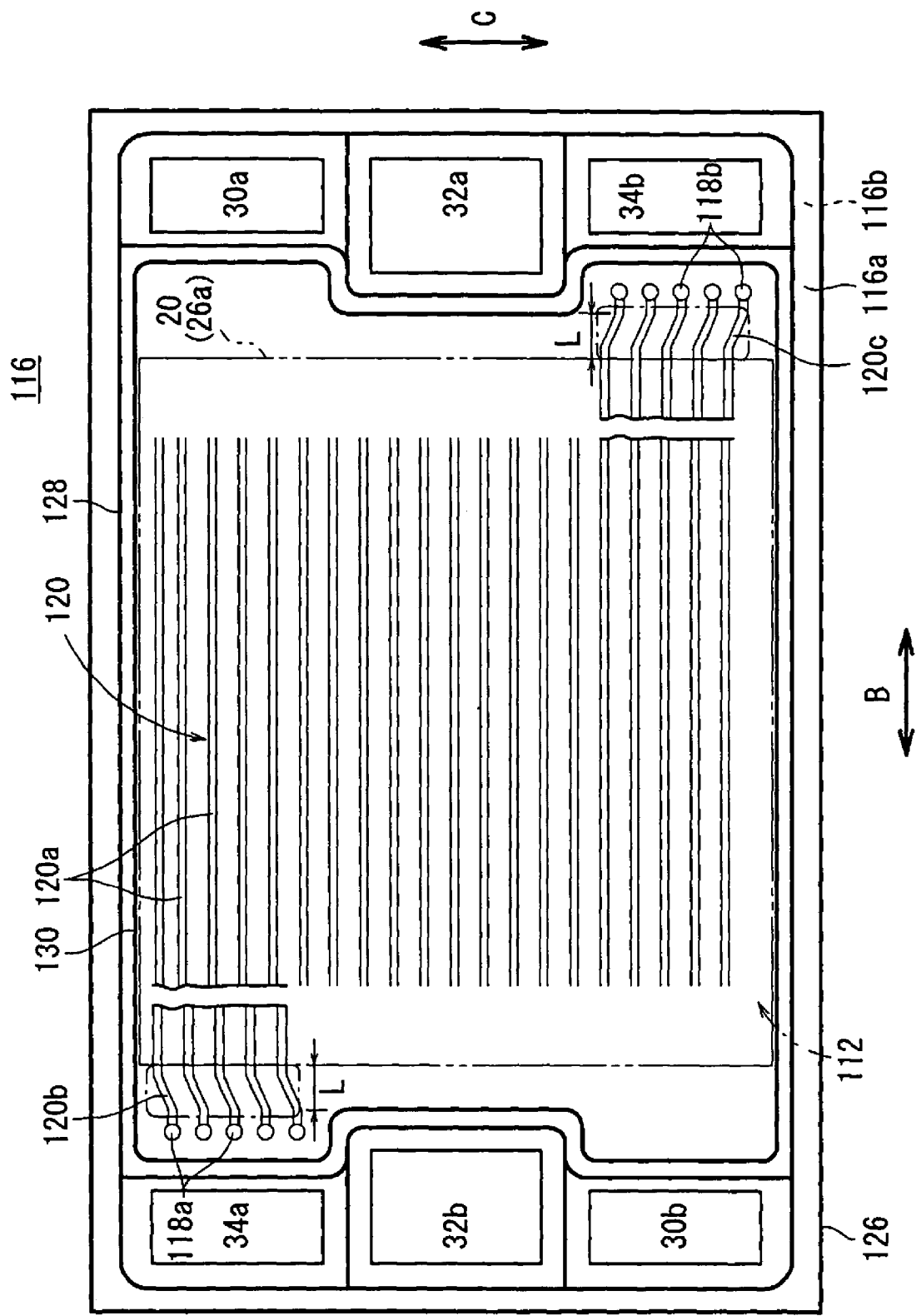
FIG. 9 is a front view showing a second metal separator of the fuel cell.

As shown in FIG. 9, the second metal separator 116 has a fuel gas flow field (reactant gas flow field) 120 on its surface 116*a* facing the membrane electrode assembly 112. The fuel gas flow field 120 comprises a plurality of fuel gas flow grooves 120*a* extending straight in the direction indicated by the arrow B. The fuel gas flow grooves 120*a* include ends 120*b*, 120*c* which are slightly inclined downwardly from the horizontal direction toward the fuel gas supply passage 34*a* and the fuel gas discharge passage 34*b*, and extended outwardly beyond the ends of the electrode catalyst layer 26*a* of the membrane electrode assembly 112. The ends 120*b*, 120*c* are connected to the supply holes 118*a* and the discharge holes 118*b*.

As shown in FIG. 8, a coolant flow field 122 is formed on a surface 116*b* of the second metal separator 116. The coolant flow field 122 is connected to the coolant supply passage 32*a* and the coolant discharge passage 32*b*. The coolant flow field 122 comprises a plurality of coolant flow grooves 122*a* extending in parallel in the direction indicated by the arrow B.

The first metal separator 114 has an oxygen-containing gas flow field (reactant gas flow field) 124 on a surface 114*a* facing the membrane electrode assembly 112. The oxygen-containing gas flow field 124 is connected to the oxygen-containing gas supply passage 30*a* and the oxygen-containing gas discharge passage 30*b*. The oxygen-containing gas flow field 124 comprises a plurality of oxygen-containing gas flow grooves 124*a* extending straight in the direction indicated by the arrow B. A surface 114*b* of the first metal separator 114 is overlapped with a surface 116*b* of the second metal separator 116 to form a coolant flow field 122. A first seal member 125 is formed integrally with the first metal separator 114, around the outer end of the first metal separator 114. The first seal member 125 is a planar seal.

As shown in FIG. 9, a second seal member 126 is formed integrally with the second metal separator 116, around the outer end of the second metal separator 116. The second seal member 126 includes an outer seal 128 and an inner seal 130 formed on the surface 116*a*. Further, as shown in FIG. 8, the second seal member 126 includes a seal 132 formed on the surface 116*b*.

In the fifth embodiment, as shown in FIG. 9, at the outlet of the fuel gas flow field 120, the ends 120*c* of the fuel gas flow grooves 120*a* are extended toward the fuel gas discharge passage 34*b* beyond the end of the electrode catalyst layer 26*a* of the membrane electrode assembly 112. Therefore, the flow rate of the purging air flowing along the fuel gas flow grooves 120a is not decreased at the ends 120c. Accordingly, the retained water can be discharged from the ends 120c into the discharge holes 118b easily and reliably.

In the structure, the same advantages as in the case of the first to fourth embodiments can be obtained. For example, even if the temperature is low, the electrode catalyst layer 26a is not frozen by the retained water. Therefore, improvement in durability of the membrane electrode assembly 112 is achieved. The fuel gas flow field 120 and the oxygen-containing gas flow field 124 comprise straight flow grooves. However, the present invention is not limited in this respect. For example, the fuel gas flow field 120 and the oxygen-containing gas flow field 124 may comprise serpentine flow grooves. Also in the following embodiments, the flow grooves are not necessarily limited to the straight flow grooves, or the serpentine flow grooves.

Figure 10:
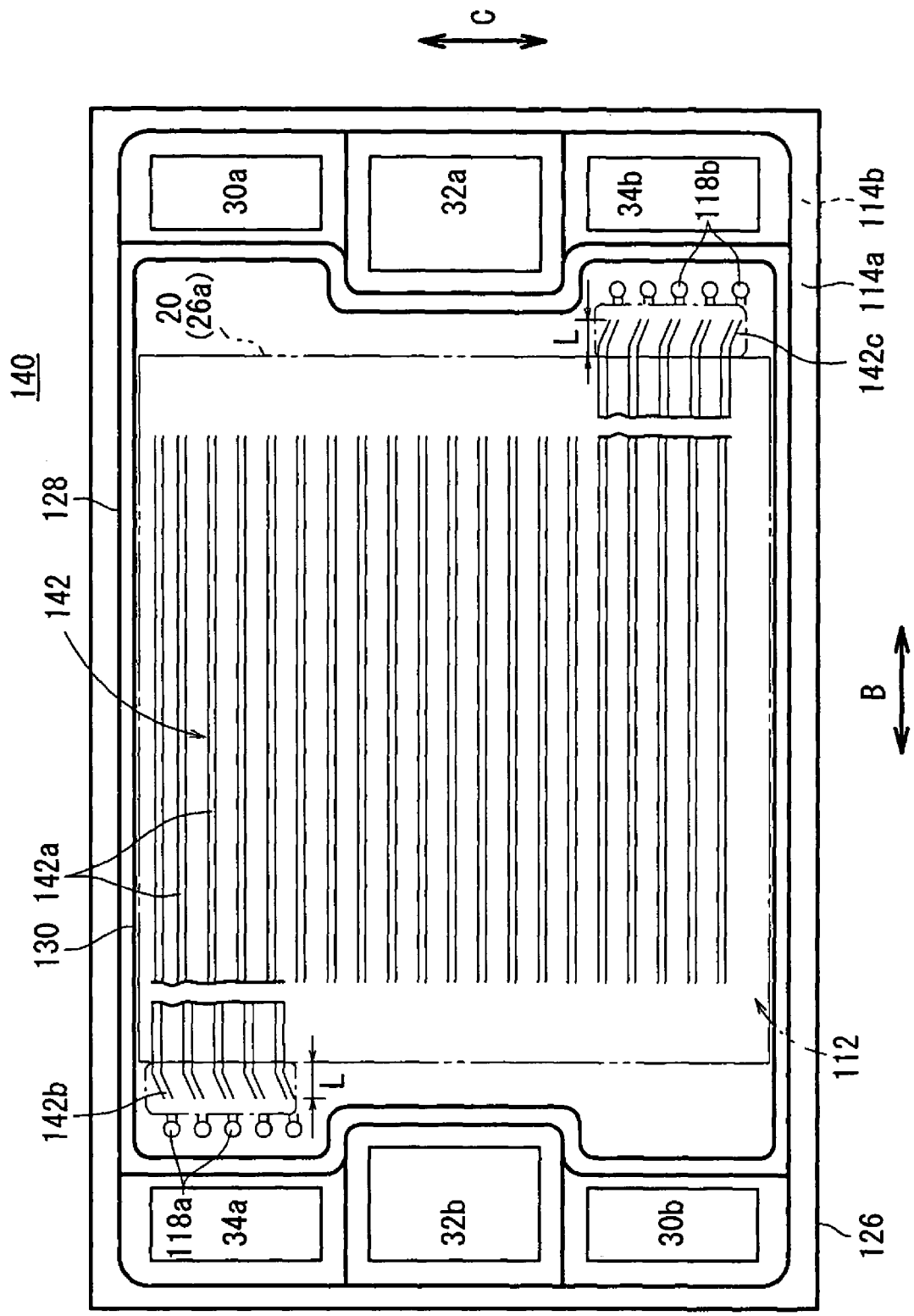
FIG. 10 is a front view showing a second metal separator of a fuel cell according to a sixth embodiment of the present invention.

FIG. 10 is a front view showing a second metal separator 140 according to a sixth embodiment of the present invention.

The second metal separator 140 has a fuel gas flow field (reactant gas flow field) 142 comprising a plurality of straight fuel gas flow grooves 142a. Ends 142b, 142c of the fuel gas flow grooves 142a are extended outwardly beyond the electrode catalyst layer 26a by the distance L toward the fuel gas supply passage 34a and the fuel gas discharge passage 34b, respectively. The ends 142b, 142c terminate at positions near channels connected to supply holes 118a and discharge holes 118b. Thus, in the sixth embodiment, the same advantages as in the case of the fifth embodiment can be obtained.

Figure 11:
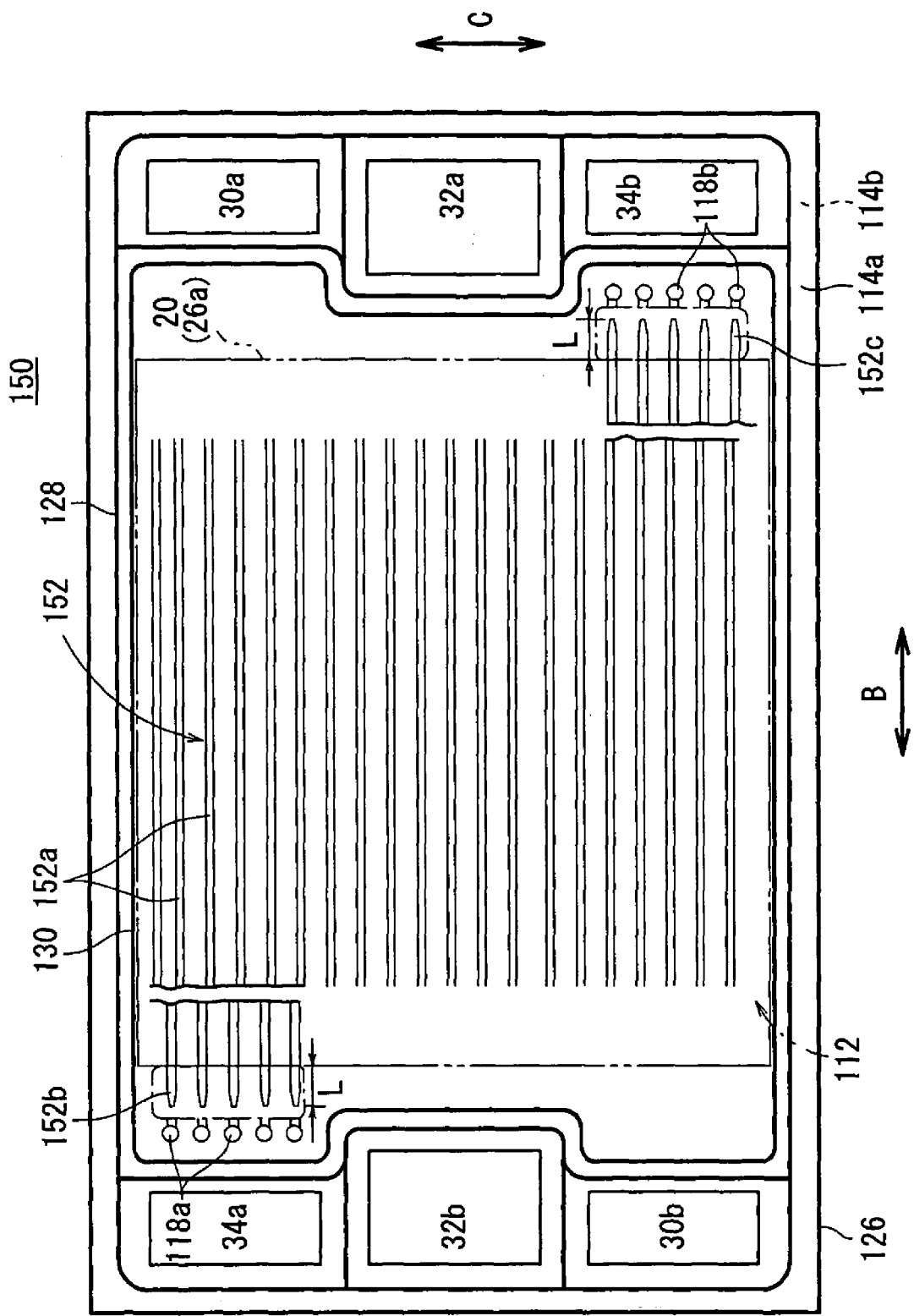
FIG. 11 is a front view showing a second metal separator of a fuel cell according to a seventh embodiment of the present invention.

FIG. 11 is a front view showing a second metal separator 150 of a fuel cell according to a seventh embodiment of the present invention.

The second metal separator 150 has a fuel gas flow field (reactant gas flow field) 152 comprising a plurality of straight (or serpentine) flow grooves 152a. Ends 152b, 152c of the fuel gas flow grooves 152a extended toward the fuel gas supply passage 34a and the fuel gas discharge passage 34b are tapered to decrease the size of the openings of the grooves in cross section toward the fuel gas supply passage 34a and the fuel gas discharge passage 34b.

In the structure, the ends 152c of the fuel gas flow field 152 are extended toward the discharge holes 118b of the electrode catalyst layer 26a. Therefore, the same advantages as in the cases of the first to sixth embodiments can be obtained. For example, the flow rate of the gas is not decreased, and the retained water is discharged reliably.

Further, since the end 152c has the tapered shape, the gas flow rate at the front portion of the end 152c is increased. Consequently, it is possible to further reliably suppress stagnation of water. Thus, in particular, even if the temperature is low, the damage of the membrane electrode assembly 112 is prevented suitably.

Figure 12:
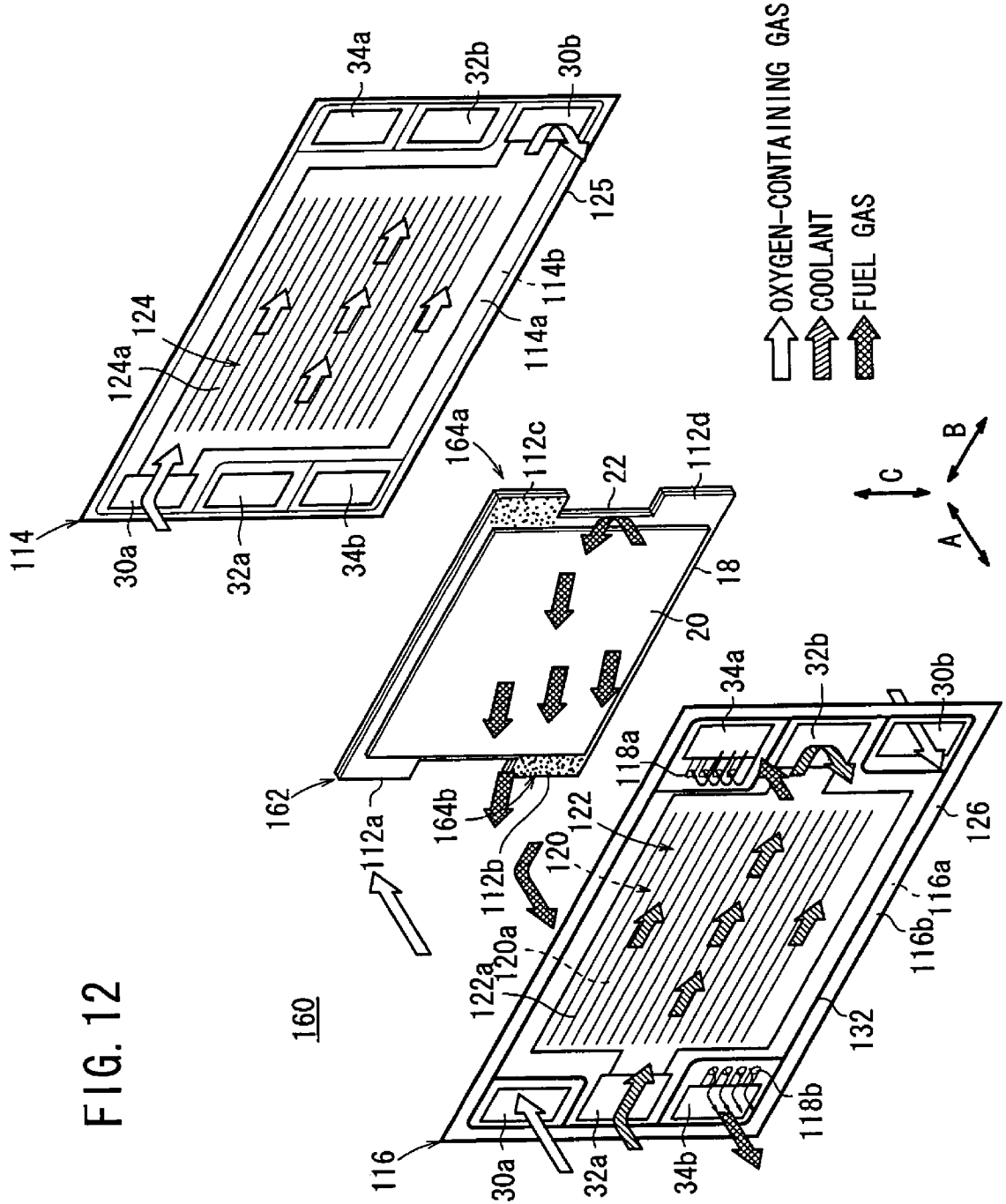
FIG. 12 is an exploded perspective view showing main components of a fuel cell according to an eighth embodiment of the present invention.

FIG. 12 is an exploded perspective view showing main components of a fuel cell 160 according to an eighth embodiment of the present invention. The constituent elements of the fuel cell 160 that are identical to those of the fuel cell 110 according to the fifth embodiment are labeled with the same reference numeral, and description thereof will be omitted.

Ends 112a to 112d of the membrane electrode assembly (electrolyte electrode assembly) 162 of the fuel cell 160 are extended outwardly in the direction indicated by the arrow B. Resin impregnation portions (reinforcement impregnation portions) 164a, 164b are provided at the ends 112c, 112b extending toward the fuel gas supply passage 34a and the fuel gas discharge passage 34b, i.e., provided in the gas diffusion layer 24b. As the impregnating resin, for example, polyetheretherketone is adopted.

In the eighth embodiment, even if water is not discharged from the fuel gas flow field 120 to the discharge holes 118b, and retained at the end 112b, it is possible to maintain the strength of the solid polymer electrolyte membrane 18 by the resin impregnation portion 164a at the end 112b. Thus, in particular, it is possible to reliably prevent the solid polymer electrolyte membrane 18 from being damaged undesirably due to freezing of the retained water. Accordingly, operation of the fuel cell can be started suitably, and improvement in durability of the fuel cell is achieved.

Figure 13:
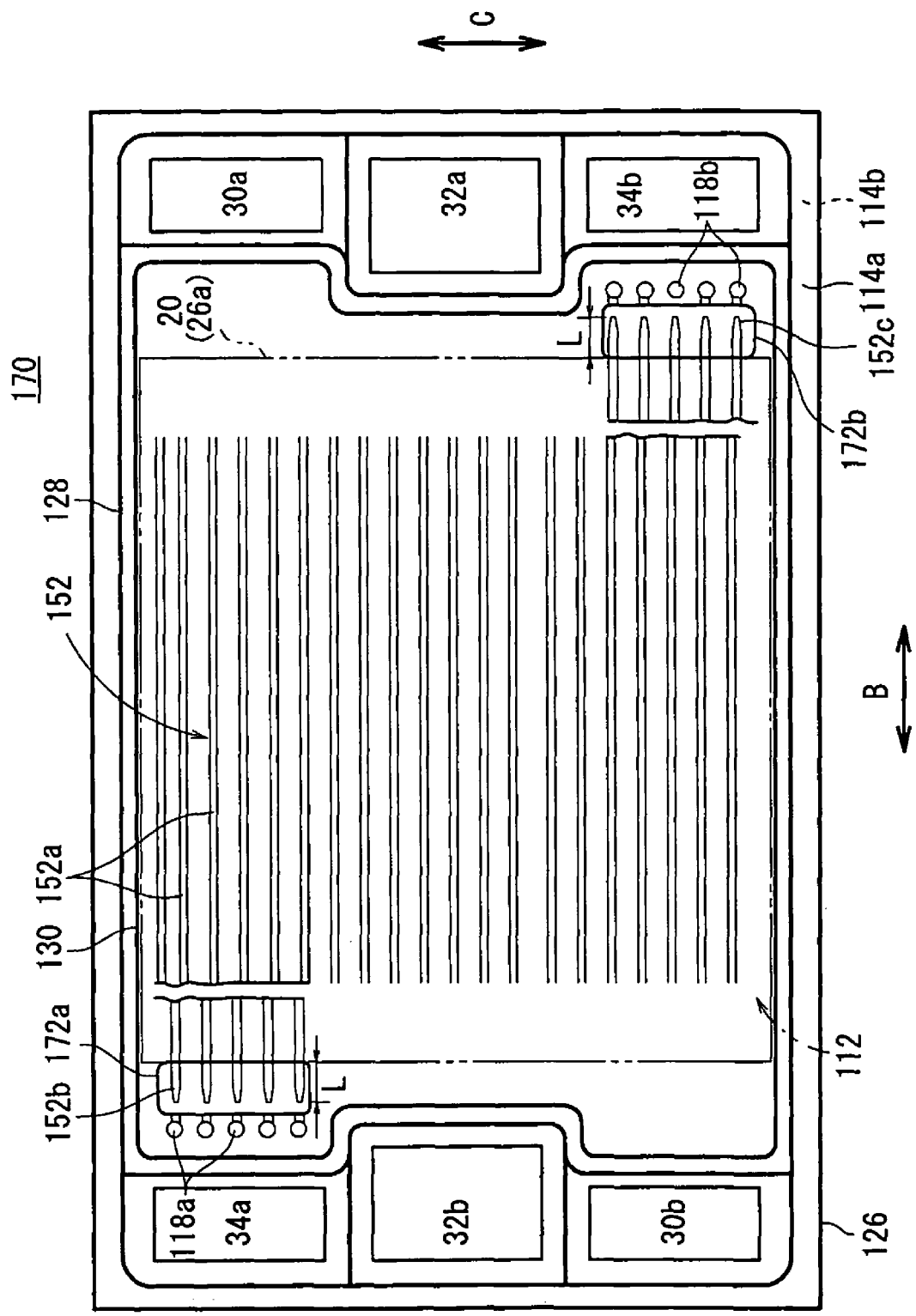
FIG. 13 is a front view showing a second metal separator of a fuel cell according to a ninth embodiment of the present invention.

FIG. 13 is a front view showing a second metal separator 170 of a fuel cell according to a ninth embodiment of the present invention. The constituent elements of the second metal separator 170 that are identical to those of the second metal separator 150 according to the seventh embodiment are labeled with the same reference numeral, and description thereof will be omitted.

The second metal separator 170 include ends 152b, 152c. Hydrophilic portions 172a, 172b are provided between the fuel gas flow field 152 and the supply holes 118a and the discharge holes 118b. For example, the hydrophilic portions 172a, 172b are formed by a gold plating surface treatment. Alternatively, the hydrophilic portions 172a, 172b may be formed using a solution obtained by mixing hydrophilic substance with liquid medium, by contacting the solution with predetermined portions of the second metal separator 170. Further, various conventional hydrophilic treatments may be used to form the hydrophilic portions 172a, 172b.

As described above, in the ninth embodiment, the hydrophilic portions 172a, 172b are provided. Therefore, in particular, when the retained water is discharged from the fuel gas flow field 152 to the discharge holes 118b, formation of water meniscus is reduced, and generation of water droplets is suppressed. Thus, it is possible to prevent the solid polymer electrolyte membrane (not shown) from being damaged by freezing of the retained water. Accordingly, operation of the fuel cell can be started suitably, and improvement in durability of the fuel cell is achieved.

Figure 14:
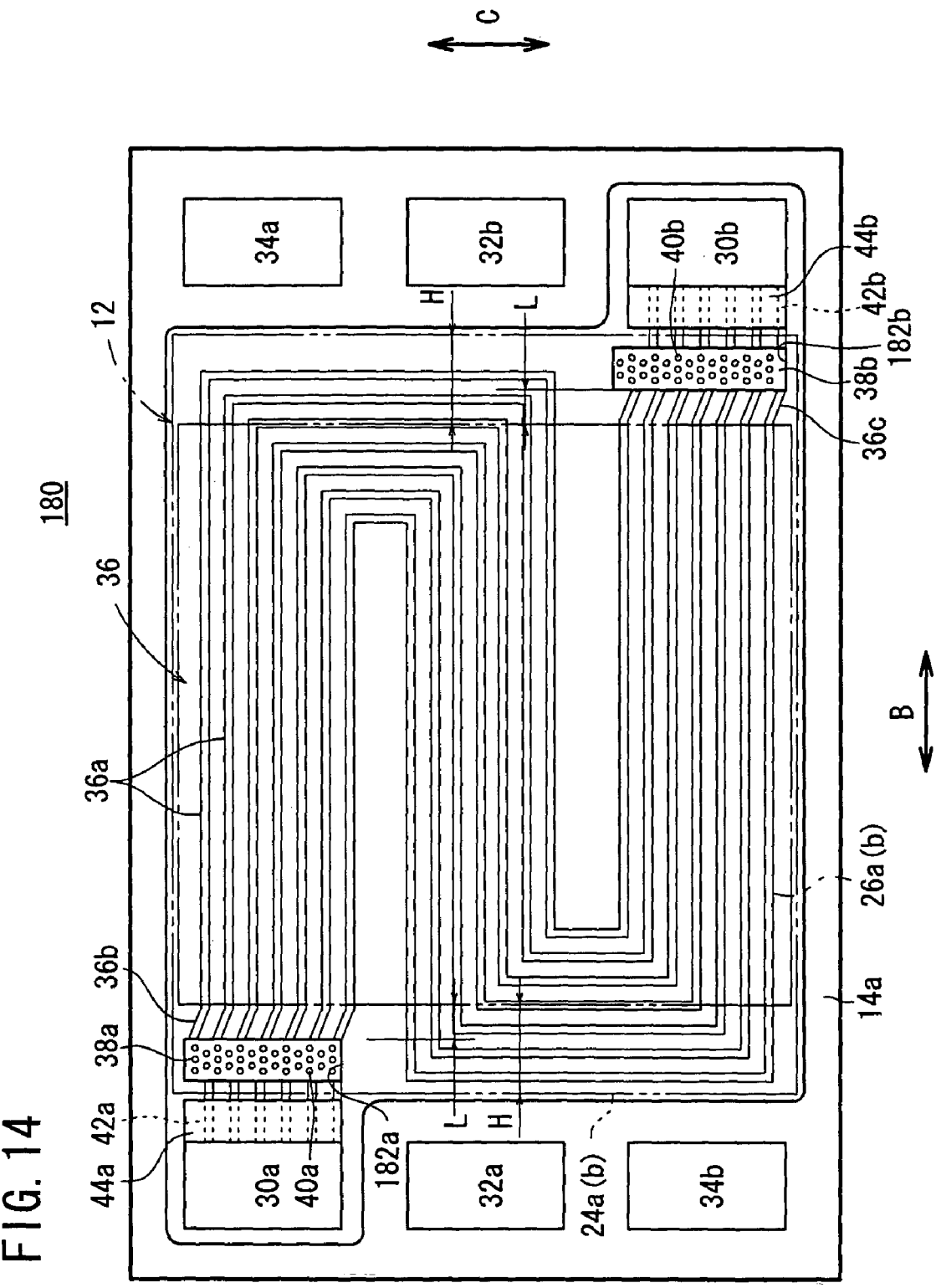
FIG. 14 is a front view showing a first metal separator of a fuel cell according to a tenth embodiment of the present invention.

FIG. 14 is a front view showing a first metal separator 180 according to a tenth embodiment of the present invention.

The ends 36b of the first metal separator 180 are inclined upwardly from the horizontal direction, and connected to the inlet buffer 38a. The heights of the bottom surface 182a of the inlet buffer 38a and the bottom surface 182b of the outlet buffer 38b are substantially the same as the bottom surface of the oxygen-containing gas supply passage 30a and the bottom surface of the oxygen-containing gas discharge passage 30b, respectively.

In the tenth embodiment, water is not retained in the inlet buffet 38a and the outlet buffer 38b. The water is smoothly discharged from connection grooves 42a, 42b to the outside of the fuel cell through the oxygen-containing gas supply passage 30a and the oxygen-containing gas discharge passage 30b.

Figure 15:
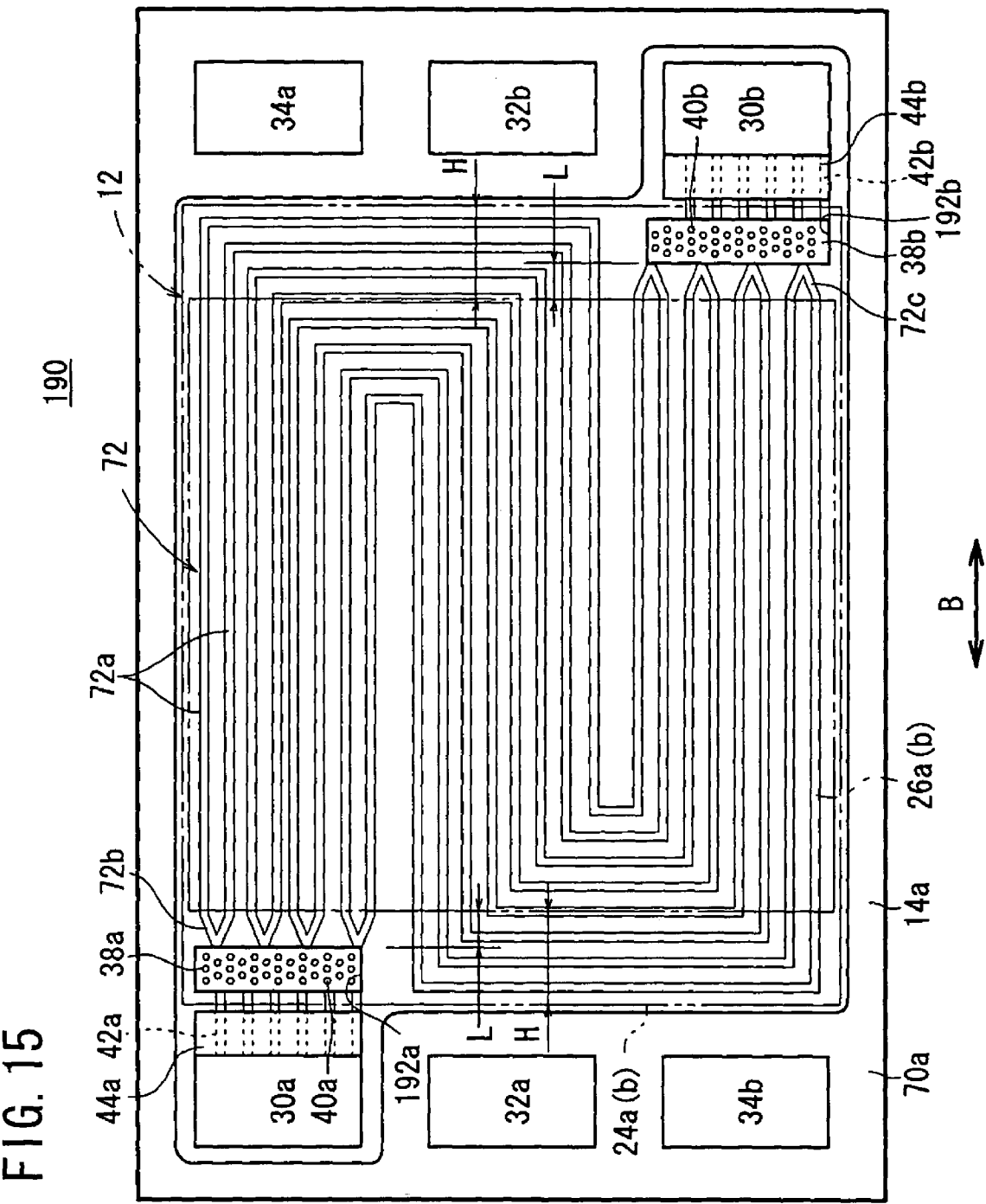
FIG. 15 is a first metal separator showing a first metal separator of a fuel cell according to an eleventh embodiment of the present invention.

FIG. 15 is a front view showing a first metal separator 190 of a fuel cell according to an eleventh embodiment of the present invention.

In the first metal separator 190, the heights of the bottom surface 192a of the inlet buffer 38a and the bottom surface 192b of the outlet buffer 38b are substantially the same as the heights of the bottom surface of the oxygen-containing gas supply passage 30a and the bottom surface of the oxygen-containing gas discharge passage 30b, respectively.

Figure 16:
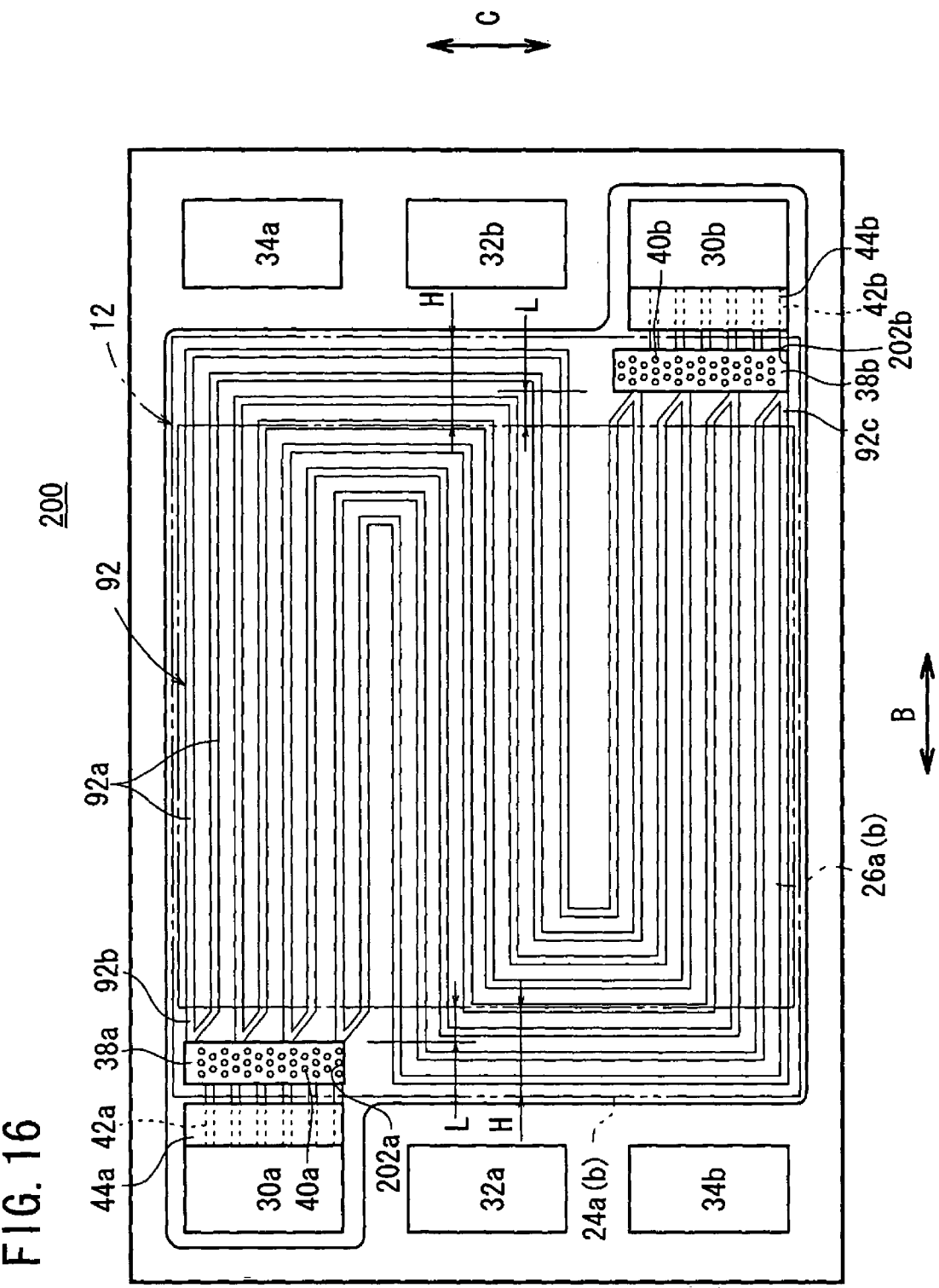
FIG. 16 is a front view showing a first metal separator of a fuel cell according to a twelfth embodiment of the present invention.

FIG. 16 is a front view showing a first metal separator 200 of a fuel cell according to a twelfth embodiment of the present invention.

The ends 92*b*, 92*c* of the first metal separator 200 are oriented oppositely to each other. The heights of the bottom surface 202*a* of the inlet buffer 38*a* and the bottom surface 202*b* of the outlet buffer 38*b* are substantially the same as the heights of the bottom surface of the oxygen-containing gas supply passage 30*a* and the bottom surface of the oxygen-containing gas discharge passage 30*b*.

Figure 17:
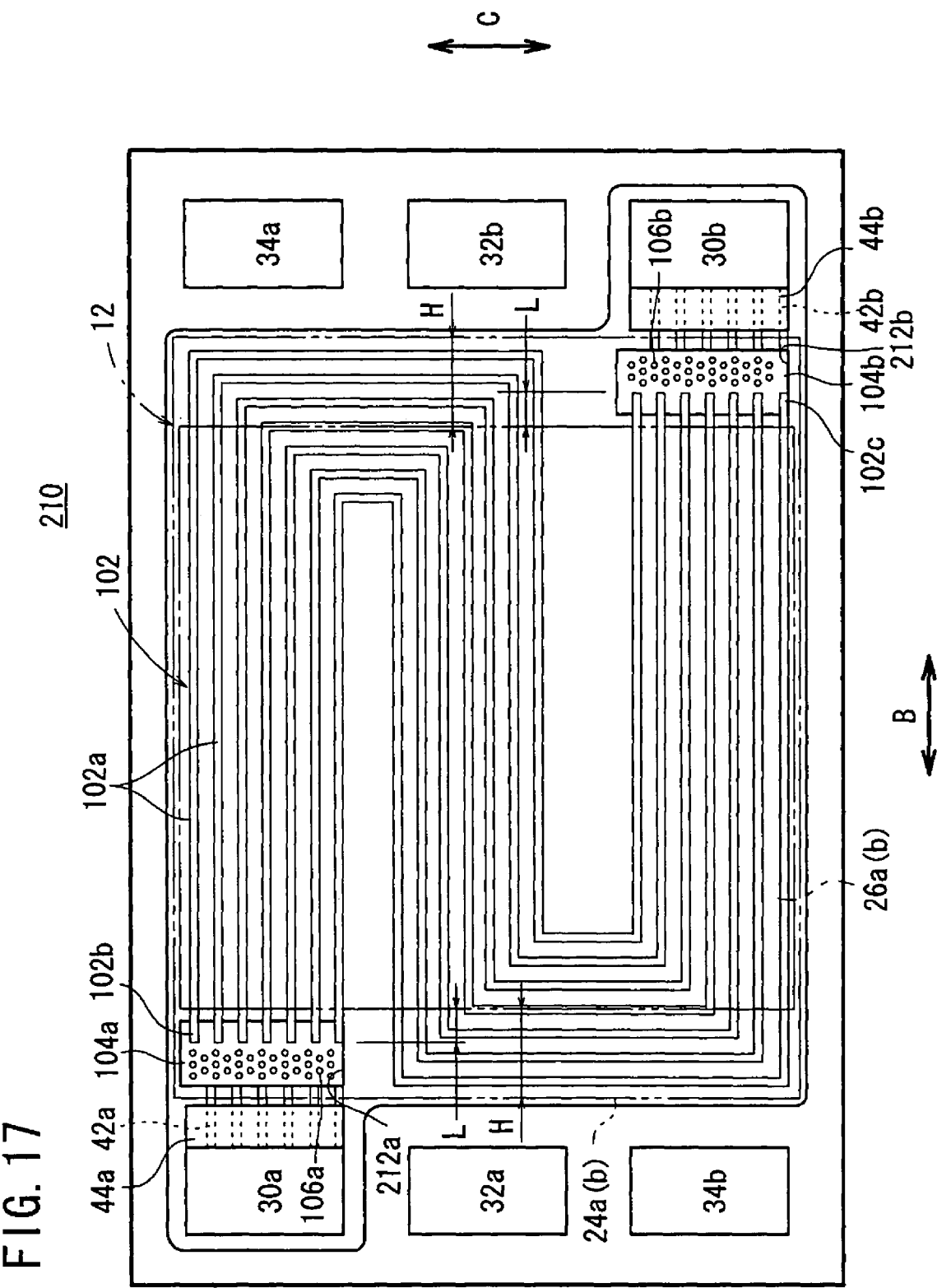
FIG. 17 is a front view showing a first metal separator of a fuel cell according to a thirteenth embodiment of the present invention.

FIG. 17 is a front view showing a first metal separator 210 of a fuel cell according to a thirteenth embodiment of the present invention.

In the first metal separator 210, the heights of the bottom surface 212*a* of the inlet buffer 104*a* and the bottom surface 212*b* of the outlet buffer 104*b* are substantially the same as the heights of the bottom surface of the oxygen-containing gas supply passage 30*a* and the bottom surface of the oxygen-containing gas discharge passage 30*b*.

Figure 18:
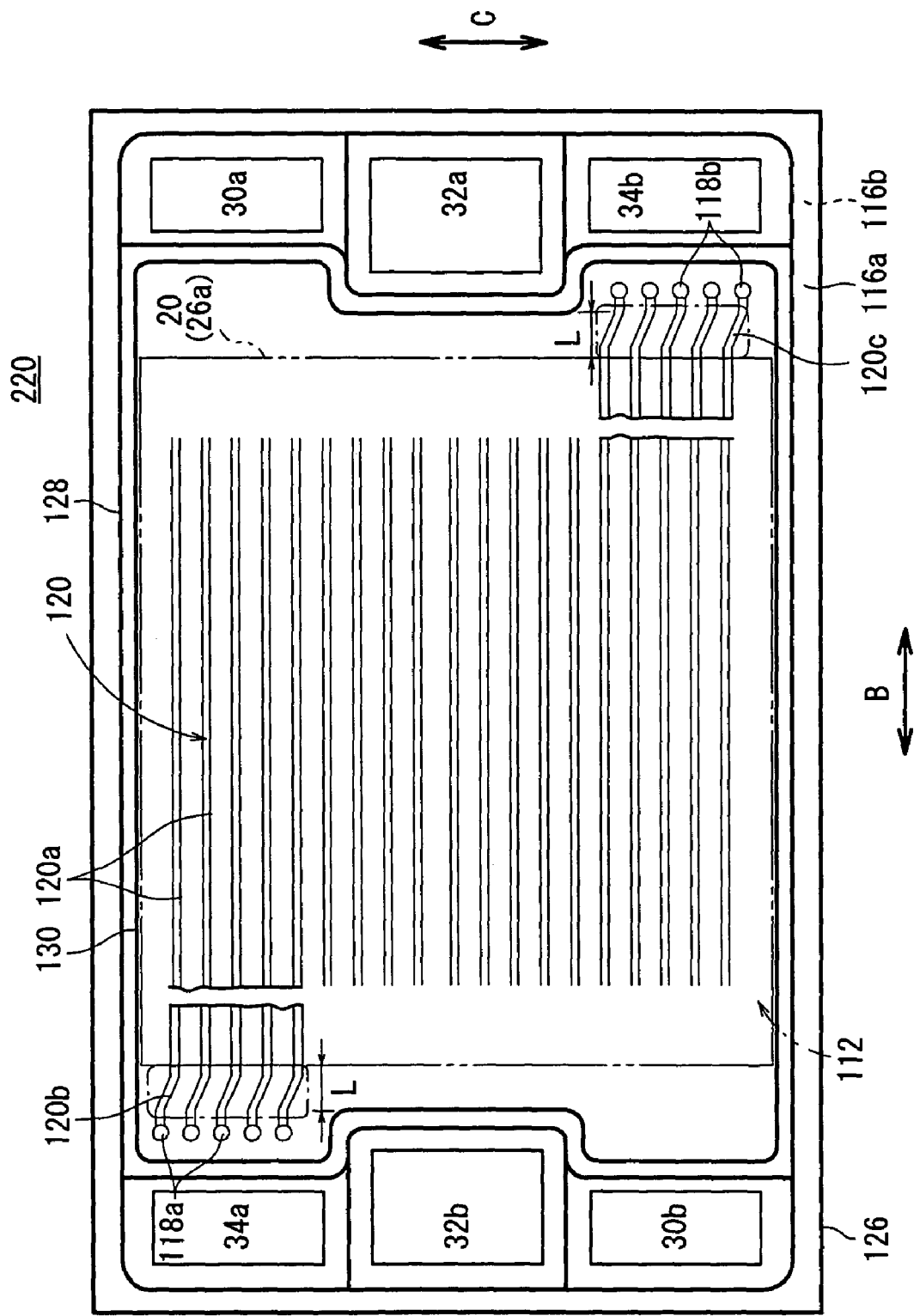
FIG. 18 is a front view showing a second metal separator of a fuel cell according to a fourteenth embodiment of the present invention.

FIG. 18 is a front view showing a second metal separator 220 of a fuel cell according to a fourteenth embodiment of the present invention. Ends 120*b* of the second metal separator 220 are inclined slightly upwardly from the horizontal direction, and connected to the supply holes 118*a*.

Figure 19:
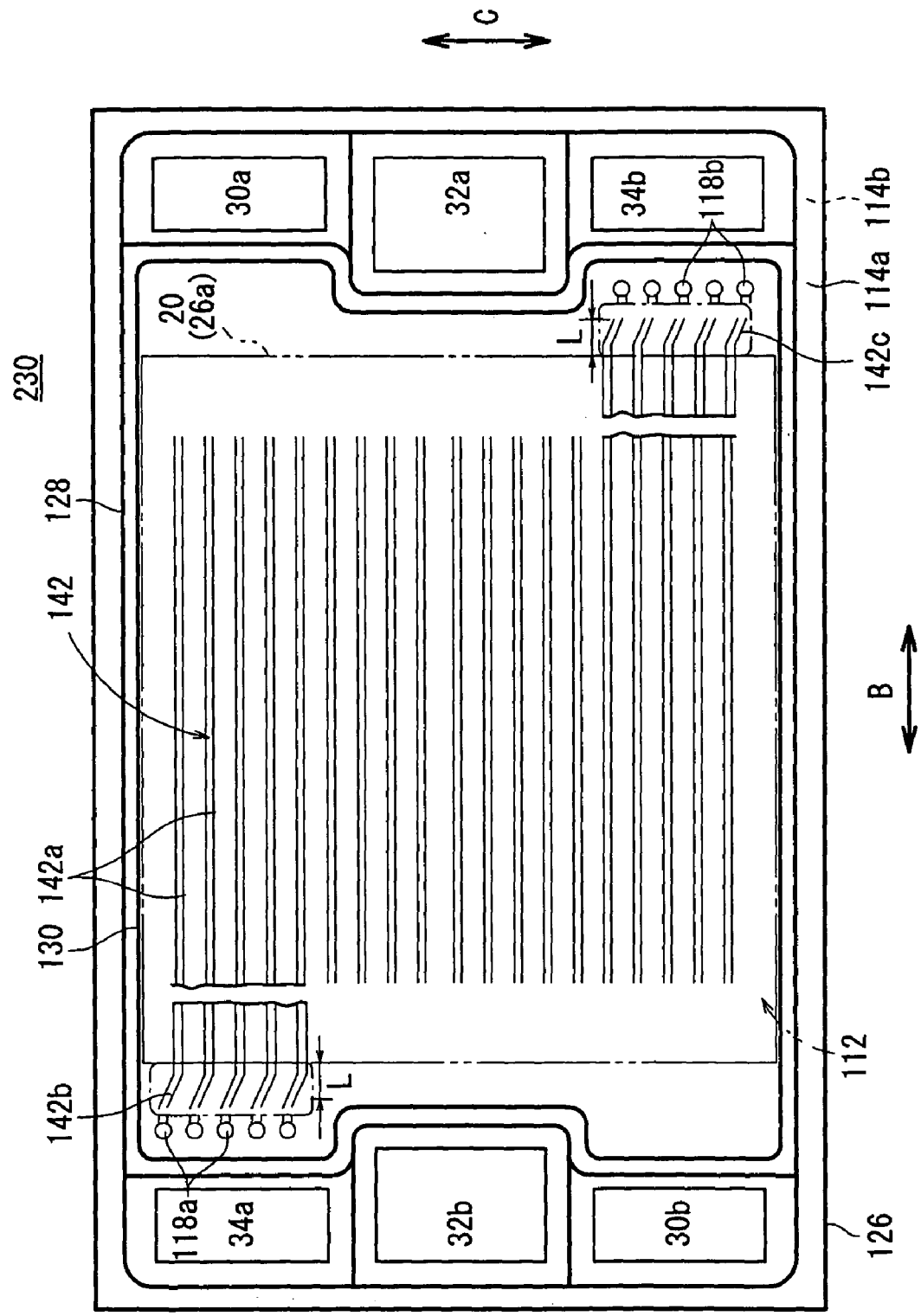
FIG. 19 is a front view showing a second metal separator of a fuel cell according to a fifteenth embodiment of the present invention.

FIG. 19 is a front view showing a second metal separator 230 according to a fifteenth embodiment of the present invention. Ends 142*b* of the second metal separator 230 are inclined slightly upwardly from the horizontal direction, and terminate at a position near the supply holes 118*a*.

It should be noted that the main features and components described in the first to fifteenth embodiments can be combined together arbitrarily, and as necessary to carry out the present invention.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking an electrolyte electrode assembly and separators horizontally, said electrolyte electrode assembly including a pair of electrodes and an electrolyte interposed between said electrodes, wherein a reactant gas flow field is formed between said electrolyte electrode assembly and one of separators sandwiching said electrolyte electrode assembly for supplying a reactant gas along a surface of said electrode, and a reactant gas passage connected to an outlet of said reactant gas flow field extends through said fuel cell in a stacking direction;
    said separator has a buffer between said reactant gas flow field and said reactant gas passage;
    said reactant gas flow field is oriented in a substantially horizontal direction,
    at the outlet of said reactant gas flow field along a surface of the separator, an end of said reactant gas flow field near said reactant gas passage is continuously extended outwardly beyond an end of an electrode catalyst layer of said electrolyte electrode assembly, and
    the end of said reactant gas flow field is inclined downwardly from the horizontal direction toward said buffer, and connected to said buffer.

2. A fuel cell according to claim 1, wherein said electrode includes said electrode catalyst layer and a gas diffusion layer; and
    said gas diffusion layer is extended outwardly beyond the end of said electrode catalyst layer, and covers said buffer.

3. A fuel cell according to claim 1, wherein the distance between the end of said reactant gas flow field and bosses of said buffer is equal to the width of grooves in said reactant gas flow field.

4. A fuel cell according to claim 1, wherein ends of a plurality of grooves of said reactant gas flow field are merged between said electrode catalyst layer and said buffer.

5. A fuel cell according to claim 1, wherein at the end of said reactant gas flow field, grooves of said reactant gas flow field are tapered to decrease the size of the openings of the grooves in cross section toward the reactant gas passage.

6. A fuel cell according to claim 1, wherein the lowermost position of said buffer is under the lowermost position of the end of said reactant gas flow field.

7. A fuel cell according to claim 1, wherein the height of the bottom surface of said buffer is the same as the height of the bottom surface of said reactant gas passage.

8. A fuel cell according to claim 1, wherein said separator has a hydrophilic portion between the end of said reactant gas flow field and said reactant gas passage.

* * * * *